(12) United States Patent
Kurihara et al.

(10) Patent No.: US 11,886,831 B2
(45) Date of Patent: Jan. 30, 2024

(54) DATA SORTING DEVICE AND METHOD, AND MONITORING AND DIAGNOSIS DEVICE

(71) Applicant: Mitsubishi Heavy Industries, Ltd., Tokyo (JP)

(72) Inventors: Tamami Kurihara, Tokyo (JP); Kengo Iwashige, Tokyo (JP); Tetsuji Morita, Tokyo (JP); Shigeki Tounosu, Tokyo (JP); Tadaaki Kakimoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 609 days.

(21) Appl. No.: 16/713,604

(22) Filed: Dec. 13, 2019

(65) Prior Publication Data
US 2020/0210144 A1    Jul. 2, 2020

(30) Foreign Application Priority Data

Dec. 27, 2018  (JP) .................................. 2018-244277

(51) Int. Cl.
*G06F 7/24* (2006.01)
*G05B 13/04* (2006.01)
(Continued)

(52) U.S. Cl.
CPC ........... *G06F 7/24* (2013.01); *G05B 13/0265* (2013.01); *G05B 13/047* (2013.01); *G06F 17/18* (2013.01); *G06N 20/00* (2019.01)

(58) Field of Classification Search
CPC ......... G06F 7/24; G06F 17/18; G05B 13/047; G05B 13/0265; G06N 20/00
(Continued)

(56) References Cited

U.S. PATENT DOCUMENTS 5,333,240 A * 7/1994 Matsumoto ........... F01D 21/003
                                                           706/904
2010/0198555 A1* 8/2010 Takahama ............... F01D 19/00
                                                           702/179
(Continued)

FOREIGN PATENT DOCUMENTS

JP   2011-175540 A   9/2011
JP   2013-109711 A   6/2013
(Continued)

OTHER PUBLICATIONS

Tao, Fei, et al., "Data-driven smart manufacturing", Journal of Manufacturing Systems, vol. 48, Part C, Jul. 2018, pp. 157-169.*
(Continued)

*Primary Examiner* — Robert Stevens
(74) *Attorney, Agent, or Firm* — Volpe Koenig

(57) ABSTRACT

The present invention provides a data sorting device and method and a monitoring and diagnosis device, which are able to create a model conveniently. A data sorting device and a monitoring and diagnosis device of the present invention include an operating data database which stores operating data of the plant equipment in a time-series manner. The devices input the operating data that are highly associated physically and engineeringly among the operating data stored in the operating data database, inputting processing attributes relevant to the operating data that are highly associated physically and engineeringly, creating a model simulating characteristics of the plant equipment, and performing data sorting, monitoring, and diagnosis through use of the model.

9 Claims, 17 Drawing Sheets

(51) Int. Cl.
*G06F 17/18* (2006.01)
*G06N 20/00* (2019.01)
*G05B 13/02* (2006.01)

(58) Field of Classification Search
USPC .......................................................... 707/752
See application file for complete search history.

(56) References Cited

U.S. PATENT DOCUMENTS

| | | | |
|---|---|---|---|
| 2012/0136629 A1* | 5/2012 | Tamaki | G05B 23/0254 702/183 |
| 2012/0290879 A1* | 11/2012 | Shibuya | G05B 23/021 714/26 |
| 2014/0195184 A1* | 7/2014 | Maeda | G01M 99/00 702/183 |
| 2015/0160098 A1* | 6/2015 | Noda | G01M 99/00 702/35 |
| 2015/0276557 A1* | 10/2015 | Masuda | G05B 23/0243 702/182 |
| 2015/0362514 A1* | 12/2015 | Tamezane | G01N 35/1002 702/33 |
| 2016/0056064 A1* | 2/2016 | Miki | H01L 21/67288 702/182 |
| 2017/0089938 A1* | 3/2017 | Tamezane | G01L 19/0092 |
| 2019/0042344 A1 | 2/2019 | Zhao et al. | |
| 2019/0171967 A1* | 6/2019 | Friesen | G05B 13/0265 |
| 2019/0197917 A1 | 6/2019 | Endo et al. | |
| 2020/0027011 A1* | 1/2020 | Olsen | G05B 23/024 |
| 2020/0103838 A1* | 4/2020 | Bertinetti | G05B 17/02 |
| 2020/0348662 A1* | 11/2020 | Cella | G05B 23/0286 |

FOREIGN PATENT DOCUMENTS

| | | |
|---|---|---|
| JP | 2017-157072 A | 9/2017 |
| JP | 6243080 B1 | 12/2017 |
| JP | 2018-063625 A | 4/2018 |
| JP | 2018-109850 A | 7/2018 |
| JP | 2018-109851 A | 7/2018 |
| WO | WO 2011/039823 A1 * 4/2011 ............ G05B 23/02 |
| WO | WO 2013/111397 A1 * 8/2013 ............ G05B 23/02 |
| WO | WO 2015/079766 A1 * 5/2015 ............ G05B 23/02 |
| WO | WO 2016/208315 A1 * 12/2016 ............ G05B 23/02 |

OTHER PUBLICATIONS

Wang, Jiang, et al., "Deep learning for smart manufacturing: Methods and application", Journal of Manufacturing Systems, vol. 48, Part C, Jul. 2018, pp. 144-156.*
Microsoft Computer Dictionary, 5th Edition, Microsoft Press, Redmond, WA, © 2002, p. 344.*
Mehdiyev, Nijat, et al., "Time Series Classification using Deep Learning for Process Planning: a Case from the Process Industry", Procedia Computer Science, vol. 114, Complex Adaptive Systems Conference with Theme: Engineering Cyber Physical Systems (CAS), held Oct. 30-Nov. 1, 2017, Chicago, IL, pp. 242-249.*
Wainberg, Michael, et al., "Deep learning in biomedicine", Nature Biotechnology, vol. 36, published online Sep. 6, 2018, pp. 829-838.*
Kroll, Björn, et al., "System modeling on machine learning for anomaly detection and predictive maintenance in industrial plants", EFTA 2014, Antonio, TX, Sep. 20-23, 1993, 7 pages.*
Kanawaday, Ameeth, et al., "Machine learning for predictive maintenance of industrial machines using IoT sensor data", ICSESS 2017, Beijing, China, Nov. 24-26, 2017, pp. 87-90.*
Syafrudin, Muhammad, et al., "Performance Analysis of IoT-Based Sensor, Big Data Processing, and Machine Learning Model for Real-Time Monitoring System in Automotive Manufacturing", Sensors (Basel), 18(9):2946, doi: 10.3390/s18092946, PMID: 30181525, PMCID: PMC6164307, Sep. 4, 2018, pp. 1-24.*
Shanthamallu, Uday Shankar, et al., "A brief survey of machine learning methods and their sensor and IoT applications", IISA 2017, Larnaca Cyprus, Aug. 27-30, 2017, pp. 1-8.*
Japanese Office Action dated Mar. 22, 2022 for Japanese Patent Application No. 2018-244277.

* cited by examiner

| y | | (x1, m1) | (x2, m2) | ⋯ (xn, mn) |
|---|---|---|---|---|
| 1 | APPARENT POWER | (PHASE-PHASE CURRENT U, ) | (PHASE-PHASE CURRENT V, ) | (PHASE-PHASE CURRENT W, ) |
| 2 | ACTIVE POWER | (PHASE-PHASE VOLTAGE U, ) | (PHASE-PHASE VOLTAGE V, ) | (PHASE-PHASE VOLTAGE W, ) |
| 3 | ACTIVE POWER | (ACTIVE POWER, ) | | |
| ⋮ | | | | |

St2 : D12, m

| y | | (x1, m1) | (x2, m2) | ⋯ (xn, mn) |
|---|---|---|---|---|
| 1 | SHAFT VIBRATION OF ROTATING ELECTRIC MACHINE | (SHAFT VIBRATION OF TURBINE, ) | | |
| 2 | SHAFT VIBRATION OF ROTATING ELECTRIC MACHINE | (GAS TEMPERATURE INSIDE MACHINE, ) | | |
| 3 | SHAFT VIBRATION OF ROTATING ELECTRIC MACHINE | (BEARING VIBRATION OF ROTATING ELECTRIC MACHINE, ) | | |
| ⋮ | | | | |

St3 : D13, m

| y | | (x1, m1) | (x2, m2) | ⋯ (xn, mn) |
|---|---|---|---|---|
| 1 | STATOR COIL TEMPERATURE | (COOLING MEDIUM TEMPERATURE INSIDE MACHINE, ) | | |
| 2 | STATOR CORE TEMPERATURE | (COOLING MEDIUM TEMPERATURE INSIDE MACHINE, ) | | |
| 3 | ROTOR COIL TEMPERATURE | (COOLING MEDIUM TEMPERATURE INSIDE MACHINE, ) | | |
| ⋮ | | | | |

FIG. 4

| NO. | NAME |
|---|---|
| 1 | REACTIVE POWER |
| 2 | ACTIVE POWER |
| 3 | APPARENT POWER |
| 4 | POWER FACTOR |
| 5 | ARMATURE CURRENT (○ PHASE) |
| 6 | ARMATURE CURRENT (△ PHASE) |
| 7 | ARMATURE CURRENT (□ PHASE) |
| 8 | ARMATURE CURRENT |
| 9 | ZERO-PHASE CURRENT |
| 10 | REVERSE PHASE CURRENT |
| 11 | POSITIVE PHASE CURRENT |
| 12 | UNBALANCED CURRENT |
| 13 | CURRENT UNBALANCE FACTOR |
| 14 | ARMATURE VOLTAGE (○ PHASE) |
| 15 | ARMATURE VOLTAGE (△ PHASE) |
| 16 | ARMATURE VOLTAGE (□ PHASE) |
| 17 | ARMATURE VOLTAGE |
| 18 | ZERO-PHASE VOLTAGE |
| 19 | REVERSE PHASE VOLTAGE |
| 20 | POSITIVE PHASE VOLTAGE |
| 21 | UNBALANCED VOLTAGE |
| 22 | VOLTAGE UNBALANCE FACTOR |
| 23 | FREQUENCY |
| 24 | ROTATIONAL SPEED |
| 25 | FIELD CURRENT |
| 26 | FIELD VOLTAGE |
| 27 | EXCITATION TRANSFORMER CURRENT |
| 28 | EXCITATION TRANSFORMER VOLTAGE |
| 29 | AUTOMATIC VOLTAGE REGULATOR CURRENT |
| 30 | AUTOMATIC VOLTAGE REGULATOR VOLTAGE |
| 31 | BRUSHLESS EXCITER ARMATURE VOLTAGE |
| 32 | BRUSHLESS EXCITER ARMATURE CURRENT |
| 33 | PMG OUTPUT VOLTAGE |
| 34 | PMG OUTPUT CURRENT |
| 35 | SHAFT CURRENT |
| 36 | SHAFT VOLTAGE |
| 37 | BEARING CURRENT |
| 38 | BEARING VOLTAGE |
| 39 | SEALED OIL PUMP ELECTRIC MOTOR CURRENT |
| 40 | SEALED OIL PUMP ELECTRIC MOTOR VOLTAGE |
| 41 | SEALED OIL PUMP ELECTRIC MOTOR OUTPUT |
| 42 | IN-MACHINE COOLING MEDIUM DRIER CURRENT |
| 43 | IN-MACHINE COOLING MEDIUM DRIER VOLTAGE |
| 44 | IN-MACHINE COOLING MEDIUM DRIER OUTPUT |
| 45 | STATOR COOLING WATER PUMP ELECTRIC MOTOR CURRENT |
| 46 | STATOR COOLING WATER PUMP ELECTRIC MOTOR VOLTAGE |
| 47 | STATOR COOLING WATER PUMP ELECTRIC MOTOR OUTPUT |

FIG. 5A

| NO. | NAME |
|---|---|
| 1 | SHAFT VIBRATION VALUE(X) OF ROTATING ELECTRIC MACHINE |
| 2 | SHAFT VIBRATION VALUE(Y) OF ROTATING ELECTRIC MACHINE |
| 3 | SHAFT VIBRATION VALUE OF ROTATING ELECTRIC MACHINE |
| 4 | BEARING VIBRATION VALUE(X) OF ROTATING ELECTRIC MACHINE |
| 5 | BEARING VIBRATION VALUE(Y) OF ROTATING ELECTRIC MACHINE |
| 6 | BEARING VIBRATION VALUE OF ROTATING ELECTRIC MACHINE |
| 7 | RESULT OF FREQUENCY ANALYSIS ON SHAFT VIBRATION WAVEFORM(FFT RESULT) |
| 8 | TURBINE SHAFT VIBRATION VALUE(X) |
| 9 | TURBINE SHAFT VIBRATION VALUE(Y) |
| 10 | TURBINE BEARING VIBRATION VALUE(X) |
| 11 | TURBINE BEARING VIBRATION VALUE(Y) |
| 12 | TURBINE SHAFT VIBRATION PHASE |
| 13 | RESULT OF FREQUENCY ANALYSIS ON TURBINE SHAFT VIBRATION WAVEFORM(FFT RESULT) |
| 14 | PUMP VIBRATION |
| 15 | PUMP ELECTRIC MOTOR VIBRATION |
| 16 | FAN VIBRATION |
| 17 | STATOR COIL TEMPERATURE(○ PHASE) |
| 18 | STATOR COIL TEMPERATURE(△ PHASE) |
| 19 | STATOR COIL TEMPERATURE(□ PHASE) |
| 20 | STATOR COIL TEMPERATURE |
| 21 | COOLING MEDIUM TEMPERATURE AT INLET OF STATOR COIL(○ PHASE) |
| 22 | COOLING MEDIUM TEMPERATURE AT INLET OF STATOR COIL(△ PHASE) |
| 23 | COOLING MEDIUM TEMPERATURE AT INLET OF STATOR COIL(□ PHASE) |
| 24 | COOLING MEDIUM TEMPERATURE AT INLET OF STATOR COIL |
| 25 | COOLING MEDIUM TEMPERATURE AT OUTLET OF STATOR COIL(○ PHASE) |
| 26 | COOLING MEDIUM TEMPERATURE AT OUTLET OF STATOR COIL(△ PHASE) |
| 27 | COOLING MEDIUM TEMPERATURE AT OUTLET OF STATOR COIL(□ PHASE) |
| 28 | COOLING MEDIUM TEMPERATURE AT OUTLET OF STATOR COIL |
| 29 | INLET TEMPERATURE OF COOLING MEDIUM FOR STATOR COIL |
| 30 | OUTLET TEMPERATURE OF COOLING MEDIUM FOR STATOR COIL |
| 31 | INLET TEMPERATURE OF COOLING MEDIUM FOR CONNECTING WIRES |
| 32 | OUTLET TEMPERATURE OF COOLING MEDIUM FOR CONNECTING WIRES |
| 33 | INLET TEMPERATURE OF COOLING MEDIUM FOR HVB |
| 34 | OUTLET TEMPERATURE OF COOLING MEDIUM FOR HVB |
| 35 | STATOR CORE CENTER PORTION TEMPERATURE(TEETH) |
| 36 | STATOR CORE EDGE PORTION TEMPERATURE(TEETH) |
| 37 | STATOR CORE CENTER PORTION TEMPERATURE(SLOT BOTTOM) |
| 38 | STATOR CORE EDGE PORTION TEMPERATURE(SLOT BOTTOM) |
| 39 | STATOR CORE EDGE PORTION TEMPERATURE(CUPPER SHIELD) |
| 40 | STATOR CORE EDGE PORTION TEMPERATURE(STATOR CORE CLAMP) |
| 41 | STATOR CORE TEMPERATURE |
| 42 | STATOR CORE CENTER PORTION TEMPERATURE |
| 43 | STATOR CORE EDGE PORTION TEMPERATURE |
| 44 | ROTOR COIL TEMPERATURE |
| 45 | BEARING METAL TEMPERATURE |
| 46 | BEARING SUPPLY OIL TEMPERATURE |
| 47 | BEARING DRAIN OIL TEMPERATURE |
| 48 | COOLING MEDIUM TEMPERATURE AT INLET OF COLLECTOR COVER |
| 49 | COOLING MEDIUM TEMPERATURE AT OUTLET OF COLLECTOR COVER |
| 50 | COOLING MEDIUM TEMPERATURE AT INLET OF BRUSHLESS EXCITER |
| 51 | COOLING MEDIUM TEMPERATURE AT OUTLET OF BRUSHLESS EXCITER |
| 52 | BRUSHLESS EXCITER FIELD WINDING TEMPERATURE |
| 53 | PMG WINDING TEMPERATURE |
| 54 | PMG INTAKE TEMPERATURE |
| 55 | PMG EXHAUST TEMPERATURE |

FIG. 5B

| NO. | NAME |
|---|---|
| 56 | HYDROGEN TEMPERATURE AT INLET OF HYDROGEN COOLER(COOLER A) |
| 57 | HYDROGEN TEMPERATURE AT INLET OF HYDROGEN COOLER(COOLER B) |
| 58 | HYDROGEN TEMPERATURE AT INLET OF HYDROGEN COOLER(COOLER C) |
| 59 | HYDROGEN TEMPERATURE AT INLET OF HYDROGEN COOLER(COOLER D) |
| 60 | HYDROGEN TEMPERATURE AT INLET OF HYDROGEN COOLER |
| 61 | HYDROGEN TEMPERATURE AT OUTLET OF HYDROGEN COOLER(COOLER A) |
| 62 | HYDROGEN TEMPERATURE AT OUTLET OF HYDROGEN COOLER(COOLER B) |
| 63 | HYDROGEN TEMPERATURE AT OUTLET OF HYDROGEN COOLER(COOLER C) |
| 64 | HYDROGEN TEMPERATURE AT OUTLET OF HYDROGEN COOLER(COOLER D) |
| 65 | HYDROGEN TEMPERATURE AT OUTLET OF HYDROGEN COOLER |
| 66 | HYDROGEN TEMPERATURE AT OUTLET OF HYDROGEN COOLER(FOR TEMPERATURE CONTROL VALVE OF SHAFT COOLING WATER) |
| 67 | SHAFT COOLING WATER INLET TEMPERATURE OF HYDROGEN COOLER(COOLER A) |
| 68 | SHAFT COOLING WATER INLET TEMPERATURE OF HYDROGEN COOLER(COOLER B) |
| 69 | SHAFT COOLING WATER INLET TEMPERATURE OF HYDROGEN COOLER(COOLER C) |
| 70 | SHAFT COOLING WATER INLET TEMPERATURE OF HYDROGEN COOLER(COOLER D) |
| 71 | SHAFT COOLING WATER INLET TEMPERATURE OF HYDROGEN COOLER |
| 72 | SHAFT COOLING WATER OUTLET TEMPERATURE OF HYDROGEN COOLER(COOLER A) |
| 73 | SHAFT COOLING WATER OUTLET TEMPERATURE OF HYDROGEN COOLER(COOLER B) |
| 74 | SHAFT COOLING WATER OUTLET TEMPERATURE OF HYDROGEN COOLER(COOLER C) |
| 75 | SHAFT COOLING WATER OUTLET TEMPERATURE OF HYDROGEN COOLER(COOLER D) |
| 76 | SHAFT COOLING WATER OUTLET TEMPERATURE OF HYDROGEN COOLER |
| 77 | AIR COOLER INLET TEMPERATURE(COOLER A) |
| 78 | AIR COOLER INLET TEMPERATURE(COOLER B) |
| 79 | AIR COOLER INLET TEMPERATURE(COOLER C) |
| 80 | AIR COOLER INLET TEMPERATURE(COOLER D) |
| 81 | AIR COOLER INLET TEMPERATURE |
| 82 | AIR COOLER OUTLET TEMPERATURE(COOLER A) |
| 83 | AIR COOLER OUTLET TEMPERATURE(COOLER B) |
| 84 | AIR COOLER OUTLET TEMPERATURE(COOLER C) |
| 85 | AIR COOLER OUTLET TEMPERATURE(COOLER D) |
| 86 | AIR COOLER OUTLET TEMPERATURE |
| 87 | SHAFT COOLING WATER INLET TEMPERATURE OF AIR COOLER(COOLER A) |
| 88 | SHAFT COOLING WATER INLET TEMPERATURE OF AIR COOLER(COOLER B) |
| 89 | SHAFT COOLING WATER INLET TEMPERATURE OF AIR COOLER(COOLER C) |
| 90 | SHAFT COOLING WATER INLET TEMPERATURE OF AIR COOLER(COOLER D) |
| 91 | SHAFT COOLING WATER INLET TEMPERATURE OF AIR COOLER |
| 92 | SHAFT COOLING WATER OUTLET TEMPERATURE OF AIR COOLER(COOLER A) |
| 93 | SHAFT COOLING WATER OUTLET TEMPERATURE OF AIR COOLER(COOLER B) |
| 94 | SHAFT COOLING WATER OUTLET TEMPERATURE OF AIR COOLER(COOLER C) |
| 95 | SHAFT COOLING WATER OUTLET TEMPERATURE OF AIR COOLER(COOLER D) |
| 96 | SHAFT COOLING WATER OUTLET TEMPERATURE OF AIR COOLER |
| 97 | SEALED OIL TEMPERATURE OF VACUUM CHAMBER |
| 98 | SEALED OIL INLET TEMPERATURE |
| 99 | SEALED OIL OUTLET TEMPERATURE |
| 100 | SHAFT COOLING WATER INLET TEMPERATURE OF SEALED OIL COOLER |
| 101 | SHAFT COOLING WATER OUTLET TEMPERATURE OF SEALED OIL COOLER |
| 102 | SEALED OIL INLET TEMPERATURE (AIR SIDE) |
| 103 | SEALED OIL INLET TEMPERATURE (HYDROGEN SIDE) |
| 104 | SEALED OIL OUTLET TEMPERATURE (AIR SIDE) |
| 105 | SEALED OIL OUTLET TEMPERATURE (HYDROGEN SIDE) |
| 106 | MAIN SEALED OIL PUMP WINDING TEMPERATURE |
| 107 | MAIN SEALED OIL PUMP WINDING OVERTEMPERATURE SWITCH |
| 108 | EMERGENCY SEALED OIL PUMP WINDING TEMPERATURE |
| 109 | EMERGENCY SEALED OIL PUMP WINDING OVERTEMPERATURE SWITCH |
| 110 | VACUUM PUMP WINDING TEMPERATURE |
| 111 | VACUUM PUMP WINDING OVERTEMPERATURE SWITCH |
| 112 | SEALED OIL TEMPERATURE AT INLET OF SEALED OIL COOLER |
| 113 | SEALED OIL TEMPERATURE AT OUTLET OF SEALED OIL COOLER |
| 114 | IN-MACHINE COOLING MEDIUM DRIER TEMPERATURE |

FIG. 5C

| NO. | NAME |
|---|---|
| 115 | STATOR COOLING MEDIUM INLET TEMPERATURE |
| 116 | STATOR COOLING MEDIUM OUTLET TEMPERATURE |
| 117 | STATOR COOLING MEDIUM OUTLET OVERTEMPERATURE SWITCH |
| 118 | STATOR COOLING MEDIUM COOLER INLET TEMPERATURE |
| 119 | STATOR COOLING MEDIUM COOLER OUTLET TEMPERATURE |
| 120 | SHAFT COOLING WATER INLET TEMPERATURE OF STATOR COOLING MEDIUM COOLER |
| 121 | SHAFT COOLING WATER OUTLET TEMPERATURE OF STATOR COOLING MEDIUM COOLER |
| 122 | STATOR COOLING MEDIUM PUMP WINDING TEMPERATURE |
| 123 | STATOR COOLING MEDIUM PUMP WINDING OVERTEMPERATURE SWITCH |
| 124 | TURBINE BUILDING ATMOSPHERE TEMPERATURE |
| 125 | BEARING COOLING WATER TEMPERATURE (COOLER INLET) |
| 126 | DEMINERALIZER WATER TEMPERATURE (AT INLET OF STATOR COOLING WATER DEVICE) |
| 127 | BEARING SUPPLY OIL TEMPERATURE |
| 128 | REACTIVE POWER |
| 129 | ACTIVE POWER |
| 130 | APPARENT POWER |
| 131 | POWER FACTOR |
| 132 | ARMATURE CURRENT (○ PHASE) |
| 133 | ARMATURE CURRENT (△ PHASE) |
| 134 | ARMATURE CURRENT (□ PHASE) |
| 135 | ARMATURE CURRENT |
| 136 | ZERO-PHASE CURRENT |
| 137 | REVERSE PHASE CURRENT |
| 138 | POSITIVE PHASE CURRENT |
| 139 | UNBALANCED CURRENT |
| 140 | CURRENT UNBALANCE FACTOR |
| 141 | ARMATURE VOLTAGE (○ PHASE) |
| 142 | ARMATURE VOLTAGE (△ PHASE) |
| 143 | ARMATURE VOLTAGE (□ PHASE) |
| 144 | ARMATURE VOLTAGE |
| 145 | ZERO-PHASE VOLTAGE |
| 146 | REVERSE PHASE VOLTAGE |
| 147 | POSITIVE PHASE VOLTAGE |
| 148 | UNBALANCED VOLTAGE |
| 149 | VOLTAGE UNBALANCE FACTOR |
| 150 | FREQUENCY |
| 151 | ROTATIONAL SPEED |
| 152 | FIELD CURRENT |
| 153 | FIELD VOLTAGE |
| 154 | EXCITATION TRANSFORMER CURRENT |
| 155 | EXCITATION TRANSFORMER VOLTAGE |
| 156 | AUTOMATIC VOLTAGE REGULATOR CURRENT |
| 157 | AUTOMATIC VOLTAGE REGULATOR VOLTAGE |
| 158 | BRUSHLESS EXCITER ARMATURE VOLTAGE |
| 159 | BRUSHLESS EXCITER ARMATURE CURRENT |
| 160 | PMG OUTPUT VOLTAGE |
| 161 | PMG OUTPUT CURRENT |
| 162 | SHAFT CURRENT |
| 163 | SHAFT VOLTAGE |
| 164 | BEARING CURRENT |
| 165 | BEARING VOLTAGE |
| 166 | SEALED OIL PUMP ELECTRIC MOTOR CURRENT |
| 167 | SEALED OIL PUMP ELECTRIC MOTOR VOLTAGE |
| 168 | SEALED OIL PUMP ELECTRIC MOTOR OUTPUT |
| 169 | IN-MACHINE COOLING MEDIUM DRIER CURRENT |
| 170 | IN-MACHINE COOLING MEDIUM DRIER VOLTAGE |
| 171 | IN-MACHINE COOLING MEDIUM DRIER OUTPUT |
| 172 | STATOR COOLING MEDIUM PUMP ELECTRIC MOTOR CURRENT |
| 173 | STATOR COOLING MEDIUM PUMP ELECTRIC MOTOR VOLTAGE |

FIG. 5D

| NO. | NAME |
|---|---|
| 174 | STATOR COOLING MEDIUM PUMP ELECTRIC MOTOR OUTPUT |
| 175 | COOLING MEDIUM TEMPERATURE AT INLET OF GENERATOR COOLING MEDIUM COOLER |
| 176 | COOLING MEDIUM TEMPERATURE AT OUTLET OF GENERATOR COOLING MEDIUM COOLER |
| 177 | STATOR COOLING WATER CONDUCTIVITY |
| 178 | STATOR COOLING WATER PH |
| 179 | STATOR COOLING WATER DISSOLVED OXYGEN CONTENT |
| 180 | COOLING WATER CONDUCTIVITY |
| 181 | COOLING WATER PH |
| 182 | COOLING WATER DISSOLVED OXYGEN CONTENT |
| 183 | OIL TEMPERATURE OF AIR EXTRACTION TANK |
| 184 | OIL LEVEL OF AIR EXTRACTION TANK |
| 185 | OIL FLOW RATE OF AIR EXTRACTION TANK |
| 186 | OIL PRESSURE OF AIR EXTRACTION TANK |
| 187 | OIL TEMPERATURE OF FLOAT TRAP |
| 188 | OIL LEVEL OF FLOAT TRAP |
| 189 | OIL FLOW RATE OF FLOAT TRAP |
| 190 | OIL PRESSURE OF FLOAT TRAP |
| 191 | OIL TEMPERATURE OF AIR EXTRACTION TANK |
| 192 | OIL LEVEL OF AIR EXTRACTION TANK |
| 193 | OIL FLOW RATE OF AIR EXTRACTION TANK |
| 194 | OIL PRESSURE OF AIR EXTRACTION TANK |
| 195 | ROTOR COOLING MEDIUM TEMPERATURE AT ROTOR INLET |
| 196 | ROTOR COOLING MEDIUM TEMPERATURE AT ROTOR OUTLET |
| 197 | ROTOR COOLING MEDIUM TEMPERATURE |
| 198 | IN-MACHINE COOLING MEDIUM DEW POINT TEMPERATURE |
| 199 | OPENING OF TEMPERATURE CONTROL VALVE FOR IN-MACHINE COOLING MEDIUM IN GENERATOR |
| 200 | OPENING OF PRESSURE REGULATING VALVE FOR IN-MACHINE COOLING MEDIUM IN GENERATOR |
| 201 | OPENING OF TEMPERATURE CONTROL VALVE FOR GENERATOR STATOR COIL COOLING MEDIUM |
| 202 | OPENING OF PRESSURE REGULATING VALVE FOR GENERATOR STATOR COIL COOLING MEDIUM |
| 203 | OPENING OF TEMPERATURE CONTROL VALVE FOR GENERATOR ROTOR COIL COOLING MEDIUM |
| 204 | OPENING OF PRESSURE REGULATING VALVE FOR GENERATOR ROTOR COIL COOLING MEDIUM |
| 205 | DIFFERENTIAL PRESSURE OF ROTOR FAN |
| 206 | GAS PURITY IN AUXILIARY SYSTEM |
| 207 | STATOR COIL VIBRATION |
| 208 | STATOR CORE VIBRATION |
| 209 | STATOR KEY BAR VIBRATION |
| 210 | STATOR CORE STATE |
| 211 | STATOR FRAME VIBRATION |
| 212 | VIBRATION OF PARTS INSIDE GENERATOR |
| 213 | PARTIAL DISCHARGE AMOUNT INSIDE GENERATOR |
| 214 | SEALED OIL VACUUM CHAMBER PRESSURE |
| 215 | IN-MACHINE OIL LEAKAGE AMOUNT |
| 216 | IN-MACHINE COOLING MEDIUM LEAKAGE AMOUNT |
| 217 | STATOR COIL COOLING MEDIUM LEAKAGE AMOUNT |
| 218 | ROTOR COIL COOLING MEDIUM LEAKAGE AMOUNT |

FIG. 6A

| NO. | NAME |
|---|---|
| 1 | STATOR COIL TEMPERATURE(○ PHASE) |
| 2 | STATOR COIL TEMPERATURE(△ PHASE) |
| 3 | STATOR COIL TEMPERATURE(□ PHASE) |
| 4 | STATOR COIL TEMPERATURE |
| 5 | COOLING MEDIUM TEMPERATURE AT INLET OF STATOR COIL(○ PHASE) |
| 6 | COOLING MEDIUM TEMPERATURE AT INLET OF STATOR COIL(△ PHASE) |
| 7 | COOLING MEDIUM TEMPERATURE AT INLET OF STATOR COIL(□ PHASE) |
| 8 | COOLING MEDIUM TEMPERATURE AT INLET OF STATOR COIL |
| 9 | COOLING MEDIUM TEMPERATURE AT OUTLET OF STATOR COIL(○ PHASE) |
| 10 | COOLING MEDIUM TEMPERATURE AT OUTLET OF STATOR COIL(△ PHASE) |
| 11 | COOLING MEDIUM TEMPERATURE AT OUTLET OF STATOR COIL(□ PHASE) |
| 12 | COOLING MEDIUM TEMPERATURE AT OUTLET OF STATOR COIL |
| 13 | INLET TEMPERATURE OF COOLING MEDIUM FOR STATOR COIL |
| 14 | OUTLET TEMPERATURE OF COOLING MEDIUM FOR STATOR COIL |
| 15 | INLET TEMPERATURE OF COOLING MEDIUM FOR CONNECTING WIRES |
| 16 | OUTLET TEMPERATURE OF COOLING MEDIUM FOR CONNECTING WIRES |
| 17 | INLET TEMPERATURE OF COOLING MEDIUM FOR HVB |
| 18 | OUTLET TEMPERATURE OF COOLING MEDIUM FOR HVB |
| 19 | STATOR CORE CENTER PORTION TEMPERATURE(TEETH) |
| 20 | STATOR CORE EDGE PORTION TEMPERATURE(TEETH) |
| 21 | STATOR CORE CENTER PORTION TEMPERATURE(SLOT BOTTOM) |
| 22 | STATOR CORE EDGE PORTION TEMPERATURE(SLOT BOTTOM) |
| 23 | STATOR CORE EDGE PORTION TEMPERATURE(CUPPER SHIELD) |
| 24 | STATOR CORE EDGE PORTION TEMPERATURE(STATOR CORE CLAMP) |
| 25 | STATOR CORE TEMPERATURE |
| 26 | STATOR CORE CENTER PORTION TEMPERATURE |
| 27 | STATOR CORE EDGE PORTION TEMPERATURE |
| 28 | ROTOR COIL TEMPERATURE |
| 29 | BEARING METAL TEMPERATURE |
| 30 | BEARING SUPPLY OIL TEMPERATURE |
| 31 | BEARING DRAIN OIL TEMPERATURE |
| 32 | COOLING MEDIUM TEMPERATURE AT INLET OF COLLECTOR COVER |
| 33 | COOLING MEDIUM TEMPERATURE AT OUTLET OF COLLECTOR COVER |
| 34 | COOLING MEDIUM TEMPERATURE AT INLET OF BRUSHLESS EXCITER |
| 35 | COOLING MEDIUM TEMPERATURE AT OUTLET OF BRUSHLESS EXCITER |
| 36 | BRUSHLESS EXCITER FIELD WINDING TEMPERATURE |
| 37 | PMG WINDING TEMPERATURE |
| 38 | PMG INTAKE TEMPERATURE |
| 39 | PMG EXHAUST TEMPERATURE |
| 40 | HYDROGEN TEMPERATURE AT INLET OF HYDROGEN COOLER(COOLER A) |
| 41 | HYDROGEN TEMPERATURE AT INLET OF HYDROGEN COOLER(COOLER B) |
| 42 | HYDROGEN TEMPERATURE AT INLET OF HYDROGEN COOLER(COOLER C) |
| 43 | HYDROGEN TEMPERATURE AT INLET OF HYDROGEN COOLER(COOLER D) |
| 44 | HYDROGEN TEMPERATURE AT INLET OF HYDROGEN COOLER |
| 45 | HYDROGEN TEMPERATURE AT OUTLET OF HYDROGEN COOLER(COOLER A) |
| 46 | HYDROGEN TEMPERATURE AT OUTLET OF HYDROGEN COOLER(COOLER B) |
| 47 | HYDROGEN TEMPERATURE AT OUTLET OF HYDROGEN COOLER(COOLER C) |
| 48 | HYDROGEN TEMPERATURE AT OUTLET OF HYDROGEN COOLER(COOLER D) |
| 49 | HYDROGEN TEMPERATURE AT OUTLET OF HYDROGEN COOLER |
| 50 | HYDROGEN TEMPERATURE AT OUTLET OF HYDROGEN COOLER (FOR TEMPERATURE CONTROL VALVE OF SHAFT COOLING WATER) |
| 51 | SHAFT COOLING WATER INLET TEMPERATURE OF HYDROGEN COOLER(COOLER A) |
| 52 | SHAFT COOLING WATER INLET TEMPERATURE OF HYDROGEN COOLER(COOLER B) |
| 53 | SHAFT COOLING WATER INLET TEMPERATURE OF HYDROGEN COOLER(COOLER C) |
| 54 | SHAFT COOLING WATER INLET TEMPERATURE OF HYDROGEN COOLER(COOLER D) |
| 55 | SHAFT COOLING WATER INLET TEMPERATURE OF HYDROGEN COOLER |

FIG. 6B

| NO. | NAME |
|---|---|
| 56 | SHAFT COOLING WATER OUTLET TEMPERATURE OF HYDROGEN COOLER (COOLER A) |
| 57 | SHAFT COOLING WATER OUTLET TEMPERATURE OF HYDROGEN COOLER (COOLER B) |
| 58 | SHAFT COOLING WATER OUTLET TEMPERATURE OF HYDROGEN COOLER (COOLER C) |
| 59 | SHAFT COOLING WATER OUTLET TEMPERATURE OF HYDROGEN COOLER (COOLER D) |
| 60 | SHAFT COOLING WATER OUTLET TEMPERATURE OF HYDROGEN COOLER |
| 61 | AIR COOLER INLET TEMPERATURE (COOLER A) |
| 62 | AIR COOLER INLET TEMPERATURE (COOLER B) |
| 63 | AIR COOLER INLET TEMPERATURE (COOLER C) |
| 64 | AIR COOLER INLET TEMPERATURE (COOLER D) |
| 65 | AIR COOLER INLET TEMPERATURE |
| 66 | AIR COOLER OUTLET TEMPERATURE (COOLER A) |
| 67 | AIR COOLER OUTLET TEMPERATURE (COOLER B) |
| 68 | AIR COOLER OUTLET TEMPERATURE (COOLER C) |
| 69 | AIR COOLER OUTLET TEMPERATURE (COOLER D) |
| 70 | AIR COOLER OUTLET TEMPERATURE |
| 71 | SHAFT COOLING WATER INLET TEMPERATURE OF AIR COOLER (COOLER A) |
| 72 | SHAFT COOLING WATER INLET TEMPERATURE OF AIR COOLER (COOLER B) |
| 73 | SHAFT COOLING WATER INLET TEMPERATURE OF AIR COOLER (COOLER C) |
| 74 | SHAFT COOLING WATER INLET TEMPERATURE OF AIR COOLER (COOLER D) |
| 75 | SHAFT COOLING WATER INLET TEMPERATURE OF AIR COOLER |
| 76 | SHAFT COOLING WATER OUTLET TEMPERATURE OF AIR COOLER (COOLER A) |
| 77 | SHAFT COOLING WATER OUTLET TEMPERATURE OF AIR COOLER (COOLER B) |
| 78 | SHAFT COOLING WATER OUTLET TEMPERATURE OF AIR COOLER (COOLER C) |
| 79 | SHAFT COOLING WATER OUTLET TEMPERATURE OF AIR COOLER (COOLER D) |
| 80 | SHAFT COOLING WATER OUTLET TEMPERATURE OF AIR COOLER |
| 81 | SEALED OIL TEMPERATURE OF VACUUM CHAMBER |
| 82 | SEALED OIL INLET TEMPERATURE |
| 83 | SEALED OIL OUTLET TEMPERATURE |
| 84 | SHAFT COOLING WATER INLET TEMPERATURE OF SEALED OIL COOLER |
| 85 | SHAFT COOLING WATER OUTLET TEMPERATURE OF SEALED OIL COOLER |
| 86 | SEALED OIL INLET TEMPERATURE (AIR SIDE) |
| 87 | SEALED OIL INLET TEMPERATURE (HYDROGEN SIDE) |
| 88 | SEALED OIL OUTLET TEMPERATURE (AIR SIDE) |
| 89 | SEALED OIL OUTLET TEMPERATURE (HYDROGEN SIDE) |
| 90 | MAIN SEALED OIL PUMP WINDING TEMPERATURE |
| 91 | MAIN SEALED OIL PUMP WINDING OVERTEMPERATURE SWITCH |
| 92 | EMERGENCY SEALED OIL PUMP WINDING TEMPERATURE |
| 93 | EMERGENCY SEALED OIL PUMP WINDING OVERTEMPERATURE SWITCH |
| 94 | VACUUM PUMP WINDING TEMPERATURE |
| 95 | VACUUM PUMP WINDING OVERTEMPERATURE SWITCH |
| 96 | SEALED OIL TEMPERATURE AT INLET OF SEALED OIL COOLER |
| 97 | SEALED OIL TEMPERATURE AT OUTLET OF SEALED OIL COOLER |
| 98 | IN-MACHINE COOLING MEDIUM DRIER TEMPERATURE |
| 99 | STATOR COOLING MEDIUM INLET TEMPERATURE |
| 100 | STATOR COOLING MEDIUM OUTLET TEMPERATURE |
| 101 | STATOR COOLING MEDIUM OUTLET OVERTEMPERATURE SWITCH |
| 102 | STATOR COOLING MEDIUM COOLER INLET TEMPERATURE |
| 103 | STATOR COOLING MEDIUM COOLER OUTLET TEMPERATURE |
| 104 | SHAFT COOLING WATER INLET TEMPERATURE OF STATOR COOLING MEDIUM COOLER |
| 105 | SHAFT COOLING WATER OUTLET TEMPERATURE OF STATOR COOLING MEDIUM COOLER |
| 106 | STATOR COOLING MEDIUM PUMP WINDING TEMPERATURE |
| 107 | STATOR COOLING MEDIUM PUMP WINDING OVERTEMPERATURE SWITCH |
| 108 | TURBINE BUILDING ATMOSPHERE TEMPERATURE |
| 109 | BEARING COOLING WATER TEMPERATURE (COOLER INLET) |
| 110 | DEMINERALIZER WATER TEMPERATURE (AT INLET OF STATOR COOLING WATER DEVICE) |
| 111 | BEARING SUPPLY OIL TEMPERATURE |
| 112 | REACTIVE POWER |
| 113 | ACTIVE POWER |
| 114 | APPARENT POWER |

FIG. 6C

| NO. | NAME |
|---|---|
| 115 | POWER FACTOR |
| 116 | ARMATURE CURRENT(○ PHASE) |
| 117 | ARMATURE CURRENT(△ PHASE) |
| 118 | ARMATURE CURRENT(□ PHASE) |
| 119 | ARMATURE CURRENT |
| 120 | ZERO-PHASE CURRENT |
| 121 | REVERSE PHASE CURRENT |
| 122 | POSITIVE PHASE CURRENT |
| 123 | UNBALANCED CURRENT |
| 124 | CURRENT UNBALANCE FACTOR |
| 125 | ARMATURE VOLTAGE(○ PHASE) |
| 126 | ARMATURE VOLTAGE(△ PHASE) |
| 127 | ARMATURE VOLTAGE(□ PHASE) |
| 128 | ARMATURE VOLTAGE |
| 129 | ZERO-PHASE VOLTAGE |
| 130 | REVERSE PHASE VOLTAGE |
| 131 | POSITIVE PHASE VOLTAGE |
| 132 | UNBALANCED VOLTAGE |
| 133 | VOLTAGE UNBALANCE FACTOR |
| 134 | FREQUENCY |
| 135 | ROTATIONAL SPEED |
| 136 | FIELD CURRENT |
| 137 | FIELD VOLTAGE |
| 138 | EXCITATION TRANSFORMER CURRENT |
| 139 | EXCITATION TRANSFORMER VOLTAGE |
| 140 | AUTOMATIC VOLTAGE REGULATOR CURRENT |
| 141 | AUTOMATIC VOLTAGE REGULATOR VOLTAGE |
| 142 | BRUSHLESS EXCITER ARMATURE VOLTAGE |
| 143 | BRUSHLESS EXCITER ARMATURE CURRENT |
| 144 | PMG OUTPUT VOLTAGE |
| 145 | PMG OUTPUT CURRENT |
| 146 | SHAFT CURRENT |
| 147 | SHAFT VOLTAGE |
| 148 | BEARING CURRENT |
| 149 | BEARING VOLTAGE |
| 150 | SEALED OIL PUMP ELECTRIC MOTOR CURRENT |
| 151 | SEALED OIL PUMP ELECTRIC MOTOR VOLTAGE |
| 152 | SEALED OIL PUMP ELECTRIC MOTOR OUTPUT |
| 153 | IN-MACHINE COOLING MEDIUM DRIER CURRENT |
| 154 | IN-MACHINE COOLING MEDIUM DRIER VOLTAGE |
| 155 | IN-MACHINE COOLING MEDIUM DRIER OUTPUT |
| 156 | STATOR COOLING MEDIUM PUMP ELECTRIC MOTOR CURRENT |
| 157 | STATOR COOLING MEDIUM PUMP ELECTRIC MOTOR VOLTAGE |
| 158 | STATOR COOLING MEDIUM PUMP ELECTRIC MOTOR OUTPUT |

FIG. 6D

| NO. | NAME |
|---|---|
| 159 | COOLING MEDIUM TEMPERATURE AT INLET OF GENERATOR COOLING MEDIUM COOLER |
| 160 | COOLING MEDIUM TEMPERATURE AT OUTLET OF GENERATOR COOLING MEDIUM COOLER |
| 161 | STATOR COOLING WATER CONDUCTIVITY |
| 162 | STATOR COOLING WATER PH |
| 163 | STATOR COOLING WATER DISSOLVED OXYGEN CONTENT |
| 164 | COOLING WATER CONDUCTIVITY |
| 165 | COOLING WATER PH |
| 166 | COOLING WATER DISSOLVED OXYGEN CONTENT |
| 167 | OIL TEMPERATURE OF AIR EXTRACTION TANK |
| 168 | OIL LEVEL OF AIR EXTRACTION TANK |
| 169 | OIL FLOW RATE OF AIR EXTRACTION TANK |
| 170 | OIL PRESSURE OF AIR EXTRACTION TANK |
| 171 | OIL TEMPERATURE OF FLOAT TRAP |
| 172 | OIL LEVEL OF FLOAT TRAP |
| 173 | OIL FLOW RATE OF FLOAT TRAP |
| 174 | OIL PRESSURE OF FLOAT TRAP |
| 175 | OIL TEMPERATURE OF AIR EXTRACTION TANK |
| 176 | OIL LEVEL OF AIR EXTRACTION TANK |
| 177 | OIL FLOW RATE OF AIR EXTRACTION TANK |
| 178 | OIL PRESSURE OF AIR EXTRACTION TANK |
| 179 | ROTOR COOLING MEDIUM TEMPERATURE AT ROTOR INLET |
| 180 | ROTOR COOLING MEDIUM TEMPERATURE AT ROTOR OUTLET |
| 181 | ROTOR COOLING MEDIUM TEMPERATURE |
| 182 | IN-MACHINE COOLING MEDIUM DEW POINT TEMPERATURE |
| 183 | OPENING OF TEMPERATURE CONTROL VALVE FOR IN-MACHINE COOLING MEDIUM IN GENERATOR |
| 184 | OPENING OF PRESSURE REGULATING VALVE FOR IN-MACHINE COOLING MEDIUM IN GENERATOR |
| 185 | OPENING OF TEMPERATURE CONTROL VALVE FOR GENERATOR STATOR COIL COOLING MEDIUM |
| 186 | OPENING OF PRESSURE REGULATING VALVE FOR GENERATOR STATOR COIL COOLING MEDIUM |
| 187 | OPENING OF TEMPERATURE CONTROL VALVE FOR GENERATOR ROTOR COIL COOLING MEDIUM |
| 188 | OPENING OF PRESSURE REGULATING VALVE FOR GENERATOR ROTOR COIL COOLING MEDIUM |
| 189 | DIFFERENTIAL PRESSURE OF ROTOR FAN |
| 190 | GAS PURITY IN AUXILIARY SYSTEM |
| 191 | STATOR COIL VIBRATION |
| 192 | STATOR CORE VIBRATION |
| 193 | STATOR KEY BAR VIBRATION |
| 194 | STATOR CORE STATE |
| 195 | STATOR FRAME VIBRATION |
| 196 | VIBRATION OF PARTS INSIDE GENERATOR |
| 197 | PARTIAL DISCHARGE AMOUNT INSIDE GENERATOR |
| 198 | SEALED OIL VACUUM CHAMBER PRESSURE |
| 199 | IN-MACHINE OIL LEAKAGE AMOUNT |
| 200 | IN-MACHINE COOLING MEDIUM LEAKAGE AMOUNT |
| 201 | STATOR COIL COOLING MEDIUM LEAKAGE AMOUNT |
| 202 | ROTOR COIL COOLING MEDIUM LEAKAGE AMOUNT |

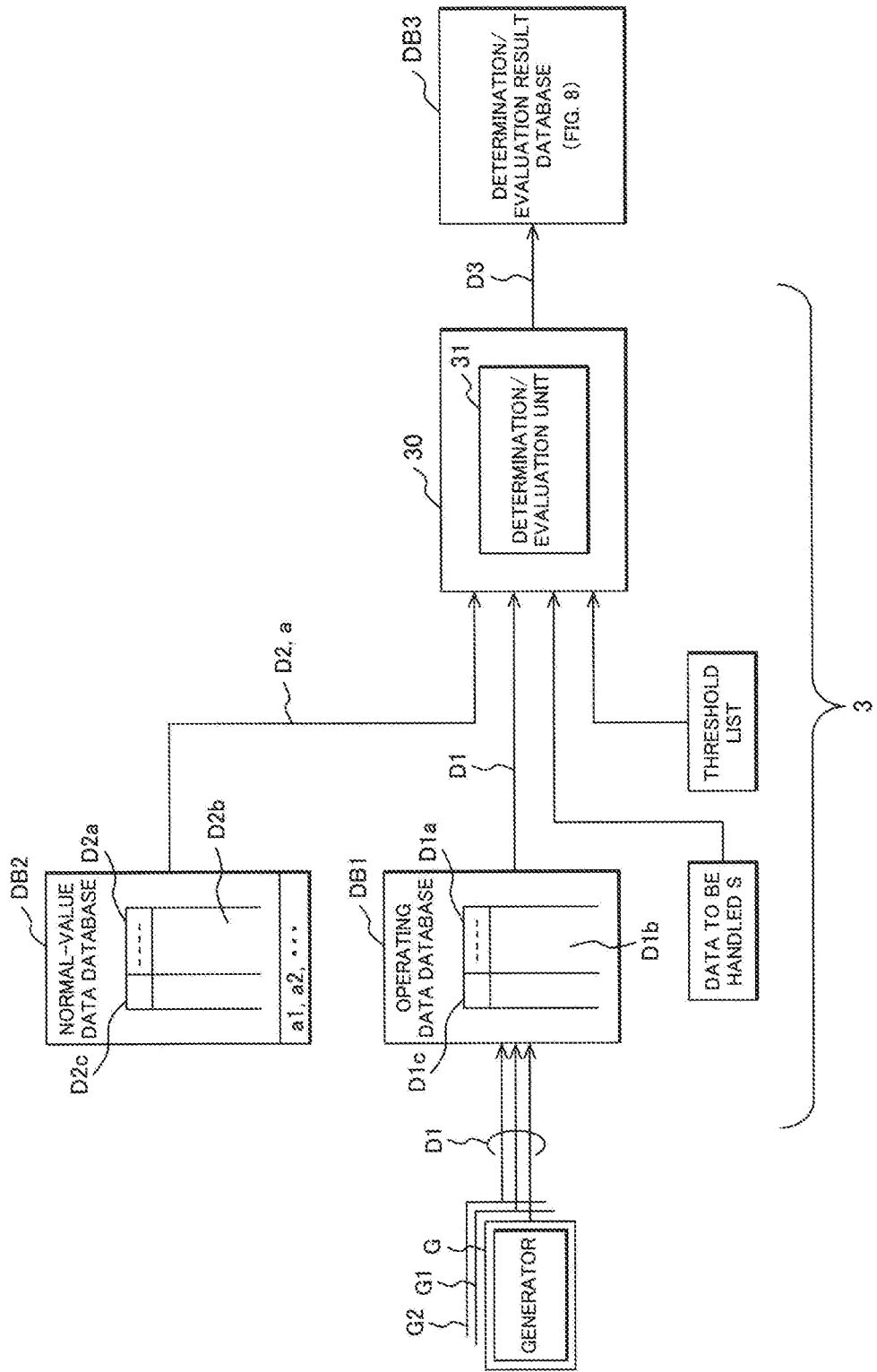

| TIME | PARAMETER D3(D3) | | |
|---|---|---|---|
| | EVALUATION METHOD | THRESHOLD | DIFFERENCE FROM THRESHOLD |
| yyyy_mm_dd hh:mm:ss | STATISTICAL METHOD | ○○ | +△△ |
| yyyy_mm_dd hh:mm:ss | STATISTICAL METHOD | ○○ | +□□ |
| yyyy_mm_dd hh:mm:ss | NOT APPLICABLE | NOT APPLICABLE | NOT APPLICABLE |
| yyyy_mm_dd hh:mm:ss | NOT APPLICABLE | NOT APPLICABLE | NOT APPLICABLE |
| yyyy_mm_dd hh:mm:ss | STATISTICAL METHOD | ○○ | +◎◎ |
| ... | | | |

| D41 ORDER OF OCCURRENCES | D42 OCCURRED EVENT | D43 PARAMETER | D44 THRESHOLD | D45 RECOMMENDATIONS |
|---|---|---|---|---|
| a-1 | ○○ VIBRATION | ○○ VIBRATION METER | ○△μm | CHECK FOR LOOSEN BOLTS IN △△ |
| a-2 | □□ TEMPERATURE RISE | □□ THERMOMETER | △□°C | CHECK FOR LOOSEN BOLTS IN △△<br>CHECK FOR LEAKAGE OF ◎◎ FROM △△ |
| a-3 | ○○ VIBRATION | ○○ VIBRATION METER | ○△◯μm | CHECK FOR LOOSEN BOLTS IN △△ |
| a-4 | □□ TEMPERATURE RISE | □□ THERMOMETER | △□△°C | CHECK FOR LOOSEN BOLTS IN △△<br>CHECK FOR LEAKAGE OF ◎◎ FROM △△ |
| a-5 | ○○ VIBRATION | ○○ VIBRATION METER | ALARM VALUE | CHECK FOR LOOSEN BOLTS IN △△ |
| a-6 | ○○ VIBRATION | ○○ VIBRATION METER | TRIP VALUE | STOP PLANT<br>CHECK FOR LOOSEN BOLTS IN △△<br>CHECK FOR LEAKAGE OF ◎◎ FROM △△ |
| b-1 | | | | |
| b-2 | ---- | | | |

| DETECTED EVENT CASES | ORDER OF OCCURRENCES | OCCURRED EVENT | PARAMETER | THRESHOLD | RESULT |
|---|---|---|---|---|---|
| CASE 1 | a-1 | ○○ VIBRATION | ○○ VIBRATION METER | ○△μm | +△△ |
| | a-2 | □□ TEMPERATURE RISE | □□ THERMOMETER | △□°C | − |
| | a-3 | ○○ VIBRATION | ○○ VIBRATION METER | ○△○μm | +□□ |
| | a-4 | □□ TEMPERATURE RISE | □□ THERMOMETER | △□△°C | − |
| | a-5 | ○○ VIBRATION | ○○ VIBRATION METER | ALARM VALUE | +◎◎ |
| | a-6 | ○○ VIBRATION | ○○ VIBRATION METER | TRIP VALUE | − |
| ... | | | | | |

D51, D52, D53, D54, D55, D56 — DB5(D5)

DATA SORTING DEVICE AND METHOD, AND MONITORING AND DIAGNOSIS DEVICE

Claim of Priority

The present application claims priority from Japanese Patent Application JP 2018-244277 filed on Dec. 27, 2018, the content of which is hereby incorporated by reference into this application.

BACKGROUND OF THE INVENTION

The present invention relates to creating a model simulating characteristics of plant equipment and conducting monitoring and diagnosis of the plant equipment through use of the model and, particularly, relates to a data sorting device, a data sorting method, and a monitoring and diagnosis device which are able to create a model conveniently.

In a wide variety of plants, it has heretofore been practiced to create models of plants and plant equipment (which will be collectively termed plant equipment hereinafter) and use these models to control a plant or apply them to monitoring and diagnosis of plant equipment.

As for creating a model of plant equipment in the above-mentioned respects, document JP 2013-109711 proposes reflecting equipment information of plant equipment in parameters of an initial model when constructing an initial plant model and adjusting the model parameters according to a degree of deviation of an output of the initial plant model at a later time when operating data is acquired.

In addition, as for conducting monitoring and diagnosis of plant equipment using created models, document JP 2018-109851 and others are known.

Furthermore, as a method of creating a model, it is known to use an AI method and utilize a machine learning method among others.

According to a method of creating a model of plant equipment described in JP 2013-109711, the number of parameters that can be set from equipment information is limited and large numbers of experiences and operating time are required to attain an improvement in the accuracy of a model. Additionally, if target equipment to be modeled is large and complex, it is unavoidable that a model and a model creating device itself become large, which results in a longer computational processing time.

In addition, according to monitoring and diagnosis of plant equipment described in JP 2018-109851, in general, there are often multiple and diversified items of monitoring for an equipment to be monitored, and it is desired to conduct monitoring and diagnosis for many items by a single monitoring and diagnosis device; it is again unavoidable that a model and a model creating device itself become large.

Furthermore, to create a highly accurate model, data that is used needs to have high accuracy, and capability to create a model conveniently is desired.

SUMMARY OF THE INVENTION

From the foregoing background, the present invention is intended to provide a data sorting device and method and a monitoring and diagnosis device, which are able to create a model conveniently.

A data sorting device for sorting operating data from plant equipment, according to one aspect of the present invention, comprises an operating data database configured to store operating data of the plant equipment in a time-series manner; and learning units configured to input the operating data that are highly associated physically and engineeringly among the operating data stored in the operating data database, input processing attributes relevant to the operating data that are highly associated physically and engineeringly, create a model simulating characteristics of the plant equipment, and form a normal-value data database including normal values by excluding abnormal values of the operating data through use of the model.

A data sorting method for creating a model simulating characteristics of plant equipment, according to another aspect of the present invention, comprises creating a model simulating characteristics of the plant equipment through use of operating data that are highly associated physically and engineeringly among the time-series operating data of the plant equipment and processing attributes relevant to the operating data that are highly associated physically and engineeringly; and obtaining normal values by excluding abnormal values of the operating data through use of the model.

A monitoring and diagnosis device for verifying the operating data in the operating data database through use of the normal-value data database created by the data sorting device, according to another aspect of the present invention, compares the operating data in the operating data database with the operating data in the normal-value data database, and forms a determination/evaluation result database including data resulting from evaluation of a difference obtained by the comparison.

A monitoring and diagnosis device that monitors plant equipment, according to another aspect of the present invention, comprises an operating data database configured to store operating data of the plant equipment in a time-series manner; a normal-value data database configured to store normal values of the operating data of the plant equipment; and a determination/evaluation unit configured to input the operating data stored in the operating data database, normal value data stored in the normal-value data database, and processing attributes relevant to the operating data that are highly associated physically and engineeringly, create a model simulating characteristics of the plant equipment, compare the operating data in the operating data database with normal value data in the normal-value data database through use of the model, and form a determination/evaluation result database including data resulting from evaluation of a difference obtained by the comparison.

According to the present invention, it is possible to provide a data sorting device and method and a monitoring and diagnosis device, which are able to create a model conveniently.

BRIEF DESCRIPTION OF THE DRAWINGS

FIG. 3 is a diagram exemplifying operating data D1 which have an input and output relation specified by data S to be handled;

FIG. 4 is a diagram exemplifying parameters D11 that are highly associated physically and engineeringly about electricity pertinent to a rotating electric machine;

FIG. 5A is a diagram exemplifying parameters D12 that are highly associated physically and engineeringly about vibration pertinent to the rotating electric machine;

FIG. 5B is a diagram exemplifying parameters D12 that are highly associated physically and engineeringly about vibration pertinent to the rotating electric machine;

FIG. 5C is a diagram exemplifying parameters D12 that are highly associated physically and engineeringly about vibration pertinent to the rotating electric machine;

FIG. 5D is a diagram exemplifying parameters D12 that are highly associated physically and engineeringly about vibration pertinent to the rotating electric machine;

FIG. 6A is a diagram exemplifying parameters D13 that are highly associated physically and engineeringly about temperature pertinent to the rotating electric machine;

FIG. 6B is a diagram exemplifying parameters D13 that are highly associated physically and engineeringly about temperature pertinent to the rotating electric machine;

FIG. 6C is a diagram exemplifying parameters D13 that are highly associated physically and engineeringly about temperature pertinent to the rotating electric machine;

FIG. 6D is a diagram exemplifying parameters D13 that are highly associated physically and engineeringly about temperature pertinent to the rotating electric machine;

FIG. 7 is a diagram depicting an example of a structure of a monitoring and diagnosis device for a generator according to a second embodiment;

FIG. 10 is a diagram representing an example of recorded contents of an abnormality-sign/abnormal-event related information database DB4;

FIG. 11 is a diagram representing an example of recorded contents of a diagnosis result database DB5;

DETAILED DESCRIPTION OF THE PREFERRED EMBODIMENTS

In the following, embodiments of the present invention will be described with the aid of the drawings.

First Embodiment

A data sorting device and method according to a first embodiment are described. Prior to this, an instance where a generator in a power plant is selected as target equipment to be modeled is described with FIG. 2.

Figure 2:
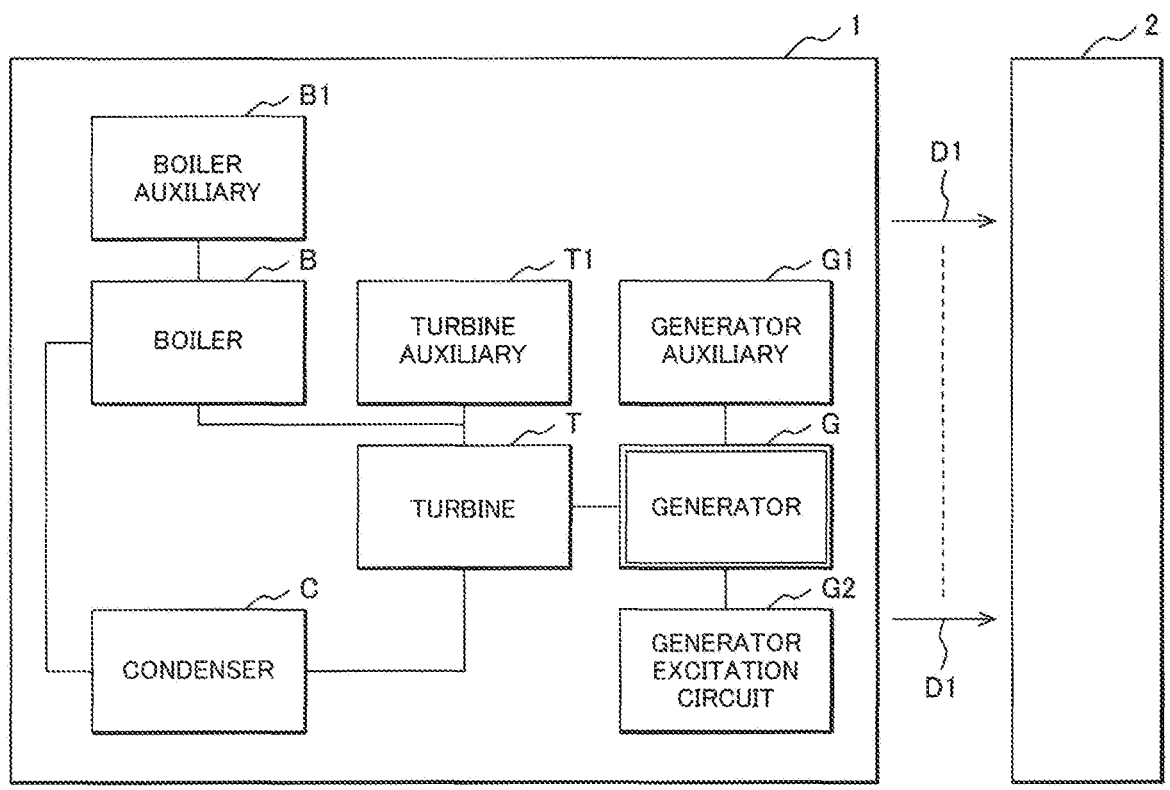
FIG. 2 is a diagram depicting an instance where a generator in a thermal power plant is selected as target equipment to be modeled.

A thermal power plant 1 in FIG. 2 is comprised of a boiler B, a turbine T, and a generator G as principal equipment and is further equipped with a boiler auxiliary B1, a turbine auxiliary T1, and generator auxiliary G1, as large auxiliaries, and, moreover a condenser C, a generator excitation circuit G2, etc. In addition, although not described in FIG. 2, from various sensors installed inside and outside the power plant 1, inter alia, various process quantities and state quantities are detected and these pieces of operating data D1 are captured into a data sorting device 2. Now, the operating data D1 should include information obtained by estimation and identification processing in addition to information directly detected by the sensors.

Figure 1:
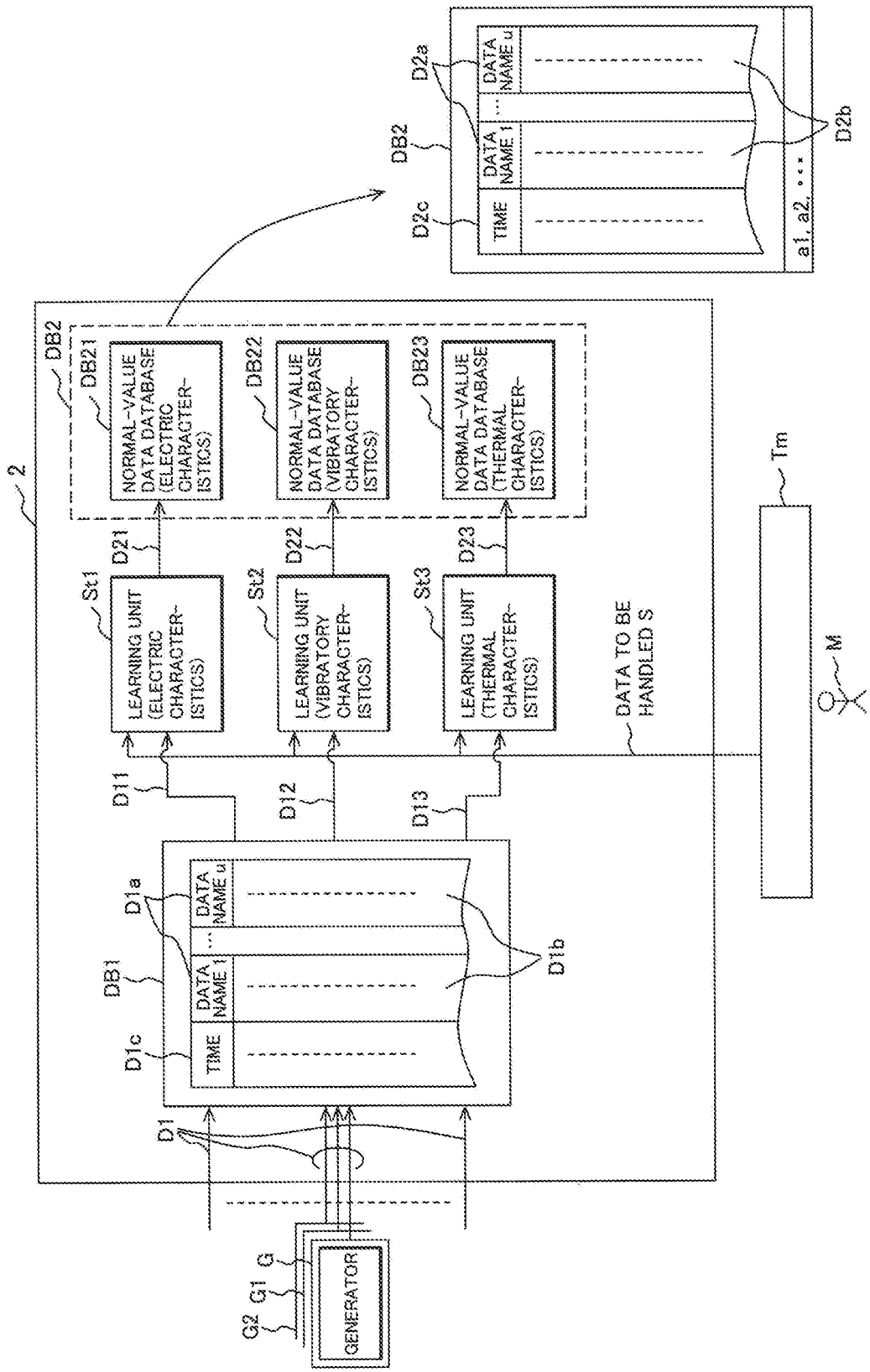
FIG. 1 is a diagram depicting an example of an overall structure of a data sorting device according to a first embodiment.

FIG. 1 depicts an example of an overall structure of the data sorting device 2 according to the present embodiment. In many cases, the data sorting device 2 is implemented with a computer device.

First, operating data D1 from the power plant 1 is stored into an operating data database DB1 as time-series information in which data name D1$a$, measurement value D1$b$, and measurement time D1$c$ are associated in a tuple. It should be noted that, when the generator G is selected as target equipment to be modeled, operating data D1 regarding, at least, the generator auxiliary G1 and generator excitation circuit G2, and moreover, a power system to which the generator G is connected are captured, and operating data at points in other parts of the plant may be captured.

With the data sorting device 2 in FIG. 1, a model designer M should determine points of view in modeling regarding the target equipment to be modeled beforehand. In this example, modeling is performed from three points of view regarding the generator G: electric, vibratory, and thermal characteristics. Thus, the data sorting device 2 in FIG. 1 is equipped with an electric characteristics learning unit St1, a vibratory characteristics learning unit St2, and a thermal characteristics learning unit St3, as learning units for model creation.

Now, if the target equipment to be modeled is not a rotating electric machine like the generator G; needless to say, a selection should be made of points of view in modeling that are appropriate and optimal according to the target equipment to be modeled. In addition, the structure of the embodiment that is presented in FIG. 1 is an example of the structure of the device that is equipped with the electric characteristics learning unit St1, vibratory characteristics learning unit St2, and thermal characteristics learning unit St3, as the learning units with respect to each of the points of view in modeling; however, needless to say, the functions of the respective learning units may be processed while being switched from one another or processed in a time division manner since the structure is configured with a computer device.

Also, the model designer M should set data S to be handled by the respective learning units St, using a terminal Tm. Here, the data S to be handled is setup data as follows: operating data D11 to be used by the electric characteristics learning unit St1 and processing attributes of such data, operating data D12 to be used by the vibratory characteristics learning unit St2 and processing attributes of such data, and operating data D13 to be used by the thermal characteristics learning unit St3 and processing attributes of such data. Now, setting of data S to be handled is performed in a way that the designer inputs data directly and, in addition, data retrieved by referring to an appropriate database may be defined as the data S to be handled.

A concept of data S to be handled is now explained with a general example. Some of operating data D1 from the power plant 1 represents an input/output correlation. When an input variable and an output variable are denoted by x and y respectively, it is supposed that a relation expressed by $y = a_1 x_1 m_1 + a_2 x_2 m_2 + a_3 x_3 m_3$ is found. In this case, operating data D11, D12, D13 included in the data S to be handled are input variables x that correlate in physical and engineering terms and an output variable y.

In addition, $a_1$, $a_2$, $a_3$ are weights (parameters) that are assigned to input variables $x_1$, $x_2$, $x_3$ and $m_1$, $m_2$, $m_3$ are processing attributes of the input variables $x_1$, $x_2$, $x_3$ in the data S to be handled. Processing attributes in the present invention indicate what processing is to be performed on the input variables x1, x2, x3, meaning that physically and engineeringly suitable arithmetic processing is to be performed on the input variables x1, x2, x3, including, for example, exponentiation, integration, differentiation, averaging, deviation, four arithmetic operations, Fourier transform, Laplace transform, exponential function, square root, logarithmic function, factorial, difference in sequence, etc.

Now, in a very simple example, the data sorting device 2 of the present invention first constructs plural models which represent the relation expressed by y=a1x1m1+a2x2m2+a3x3m3 to form a group of models. Then, in a next stage, the device performs processing to sort out only operating data that indicate normal values from within the whole set of operating data through use of the models. At this point of time, unknown quantities are weights a1, a2, a3 that are assigned to the input variables x1, x2, x3. According to the data S to be handled, each learning unit St is to perform processing to estimate the unknown weights a1, a2, a3 using time-series operating data which has been selected and input (the input variables x that correlate in physical and engineering terms and the output variable y as the operating data D11, D12, D13).

A model designer M in the present invention is assumed to understand input and output correlations in physical and engineering terms among plural pieces of operating data of the power plant and should set a combination of operating data which is taken as an output variable y, operating data which is taken as input variables x, and their processing attributes as the data S to be handled, for example, using the terminal Tm. As these settings, with regard to each of electric, vibratory, and thermal characteristics, the designer should set all pieces of data that he or she grasps to the extent possible. Combinations as a result of this setting are stored in the respective learning units (the electric characteristics learning unit St1, vibratory characteristics learning unit St2, and thermal characteristics learning unit St3).

Now, in FIG. 1, operating data D11 to be used by the electric characteristics learning unit St1, operating data D12 to be used by the vibratory characteristics learning unit St2, and operating data D13 to be used by the thermal characteristics learning unit St3 denote that operating data D1 which have an input and output relation specified by the data S to be handled is captured into each of the learning units (electric characteristics learning unit St1, vibratory characteristics learning unit St2, and thermal characteristics learning unit St3).

FIG. 3 is a diagram exemplifying operating data D1 which have an input and output relation specified by the data S to be handled and processing attributes of such data. An upper part of FIG. 3 exemplifies the operating data D11 to be used by the electric characteristics learning unit St1, a middle part of FIG. 3 exemplifies the operating data D12 to be used by the vibratory characteristics learning unit St2 and processing attributes of such data, and a lower part of FIG. 3 exemplifies the operating data D13 to be used by the thermal characteristics learning unit St3 and processing attributes of such data.

The operating data D11 and processing attributes of such data are tabulated in a table in the upper part of FIG. 3, the table describing the following relations in order from top: apparent power is determined by phase-phase currents of three phases of U, V, and W; active power is determined by phase-phase voltages of three phases of U, V, and W; and active power is determined by apparent power. These relations are examples of highly associated states in physical and engineering terms regarding an electrical part in which a rotating electric machine and a rotating electric machine auxiliary are engaged, which are enumerated and described one by one.

The operating data D12 and processing attributes of such data are tabulated in a table in the middle part of FIG. 3, the table describing, in order from top, a physical and engineering relation 1 in which shaft vibration of a rotating electric machine is generated by being exited by driving-side shaft vibration, a physical and engineering relation 2 in which shaft vibration of a rotating electric machine is generated by unbalanced thermal expansion due to increasing shaft temperature with a rise in temperature inside the machine, and a physical and engineering relation 3 in which abnormal bearing vibration is generated by excessive shaft vibration, which are enumerated and described one by one.

The operating data D13 and processing attributes of such data are tabulated in a table in the lower part of FIG. 3, the table describing, in order from top, a physical and engineering relation 1 in which a stator coil is cooled by a cooling medium inside the machine, a physical and engineering relation 2 in which a stator core is cooled by a cooling medium inside the machine, and a physical and engineering relation 3 in which a rotor coil is cooled by a cooling medium inside the machine, which are enumerated and described one by one.

Now, although examples in which columns of processing attributes m are blank are exemplified in FIG. 3, when physically and engineeringly suitable arithmetic processing is performed on input variables x, including exponentiation, integration, differentiation, averaging, deviation, four arithmetic operations, Fourier transform, Laplace transform, exponential function, square root, logarithmic function, factorial, difference in sequence, etc., information about such processing will be described as appropriate. Also, although not explicitly presented in the examples in FIG. 3, it is needless to say that a formula for determining an output variable y from plural input variables x is also expressed and described likewise.

Thus, the operating data D11, D12, D13 construed to be highly related or associated physically and engineeringly and processing attribute information m of such data are given as time-series information to each of the learning units (electric characteristics learning unit St1, vibratory characteristics learning unit St2, and thermal characteristics learning unit St3).

Here, the models are assumed to represent the relation expressed by y=a1x1m1+a2x2m2+a3x3m3 in the foregoing example. From this relation, input variables x1, x2, x3, an output variable y, and a processing attribute m (physically and engineeringly suitable arithmetic processing including, for example, exponentiation, integration, differentiation, averaging, deviation, four arithmetic operations, Fourier transform, Laplace transform, exponential function, square root, logarithmic function, factorial, difference in sequence, etc.) are given to the learning units (electric characteristics learning unit St1, vibratory characteristics learning unit St2, and thermal characteristics learning unit St3, and therefore, constructing the models can be accomplished by determining the remaining weights (parameters) a1, a2, a3 through processing by the learning units St.

The learning units (electric characteristics learning unit St1, vibratory characteristics learning unit St2, and thermal characteristics learning unit St3) determine the weights (parameters) a1, a2, a3 from the time-series information of the given operating data D11, D12, 13. As an example of specific means for doing this, the weights can be determined through multiple regression analysis processing. According to multiple regression analysis processing, the weights (parameters) a1, a2, a3 can be determined as gradients that multiple data groups measured at different times show.

Then, the learning units St applies the operating data D11, D12, D13 to the created models and distinguishes between abnormal value data and normal value data through screening of data groups between the operating data D11, D12, D13 given to the models and outputs of the models. For example, when an output of a model does not agree with a corresponding input to the model (a difference more than a predefined value occurs), the input to the model is excluded and a normal value is only extracted. Moreover, the extracted normal value is given to the model again as an input and re-screening is repeatedly performed until data is stabilized; thereby, normal value data is only extracted eventually.

Thus, through computation by the learning units St, it is also possible to create normal value data in learned data (normal data) corresponding to measured values which are transmitted from measuring instruments and/or computing elements of respective equipment in the fire power plant by operation of the fire power plant, using a statistical method (a method that finds regularity/irregularity of data properties and creates a model) and/or machine learning (a method in which algorithm in itself automatically learns from data and creates a model through iterative processing)/or deep learning (a method that performs dimensional compression to extract relations between variables, gives the same data as an input to an output, and learns so that the output will reproduce (reconstruct) the input, thus creating a model).

It should be noted that, in the present invention, a method of determining the weights (parameters) a1, a2, a3 is not limited to the abovementioned one and an appropriate method can be adopted. On a side node, diverse thresholds that are needed in performing the statistical method, machine learning, or deep learning are assumed to be designed separately and reflected in computation by the learning units St.

Pieces of information corresponding to the weights (parameters) a1, a2, a3 determined by processing performed by the abovementioned learning units (electric characteristics learning unit St1, vibratory characteristics learning unit St2, and thermal characteristics learning unit St3) are stored into normal-value data databases DB2 (an electric characteristics normal-value data database DB21, a vibratory characteristics normal-value data database DB22, and a terminal characteristics normal-value data database DB23) respectively, together with other pieces of information (input variables x, an output variable y, and processing attributes m). It can be stated in another way that contents stored in the individual normal-value data databases DB21, DB22, DB23 are databases comprised of operating data retrieved from the contents stored in the operating data database DB1 according to data S to be handled and the data S to be handled, further including the weights (parameters) a1, a2, a3 determined by the learning units St and databases with the operating data comprised of normal values.

A structure example of the normal-value data databases DB2 is presented in FIG. 1. The structure of the normal-value data databases DB2 is basically the same as that of the operating data database DB1 and normal value data D2 is stored into the normal-value data databases DB2 as time-series information in which data name D2a, measurement value D2b, and measurement time D2c are associated in a tuple. It should be noted that the normal-value data databases DB2 may include, inter alia, the pieces of information such as the weights (parameters) a1, a2, a3 determined by the learning units St as other pieces of information. However, in depiction in FIG. 1, it is denoted that some of the contents of the normal-value data databases DB2 is deleted as abnormal value data.

Because it is important that each of the normal-value data databases DB2 is constructed only with pieces of normal value data D2 through a series of processing operations described above, it is expedient in the present invention to individually execute handling steps which will be described below for sorting out only normal value data D2 (electric characteristics normal value data D21, vibratory characteristics normal value data D22, and thermal characteristics normal value data D23).

A first handling step for deriving normal value data D2 is screening at a stage when sensor signals are input from the plant; this step carries out preprocessing such as eliminating, e.g., harmonic components which are unwanted for modeling.

A second handling step for deriving normal value data D2 is selecting a term of data to be reflected in model creation from long-term data stored in the operating data database DB1; this causes the device to learn only with data acquired for a term of normal operation specified by the model designer M.

A third handling step for deriving normal value data D2 is to perform processing to exclude abnormal data by utilizing a publicly known analysis method as processing in the learning units St. As analysis methods applicable in the present invention, statistical methods described in literature, such as "A Dictionary of Statistics, Second Edition" co-authored by Graham J. G. Upton and Ian Cook, published in 2008 by Oxford University Press and "Cambridge Dictionary of Statistics" published by Cambridge University Press or methods by machine learning and deep learning are useful and the third handing step can be implemented with a single or a combination of these methods. Any method that makes it possible to exclude abnormal values and sort out only normal values is applicable in the present invention; needless to say, not limited to the methods described in the abovementioned literature.

According to the foregoing, operating data that is stored in the normal-value data databases DB2 is comprised only of normal value data D2. Among the normal-value data databases DB2, normal value data D21 regarding electric characteristics of the generator is stored in the electric characteristics normal-value data database DB21, normal value data D22 regarding vibratory characteristics of the generator is stored in the vibratory characteristics normal-value data databases DB22, and thermal characteristics normal value data D23 of the generator is stored in the thermal characteristics normal-value data databases DB23.

Now, normal value data D2 stored in the normal-value data databases DB2 contributes to creating a model with higher accuracy by being repetitively reflected in model creation in the learning units St at a later time. This makes it possible to make a more accurate calculation of weight information indicative of characteristics that are expressed by models.

In this way, points of view in modeling are selected comprehensively and model creation and data sorting processing in each point of view are performed by a model designer M specialized in each particular technical field. Modeling and data sorting in individual parts are performed easily and, in addition, overall modeling and data sorting for the generator as a whole can be enabled. Additionally, modeling in each point of view can be implemented for a short time and at high accuracy under an environment where the load on a computer that executes the modeling is alleviated.

In the data sorting device and method according to the first embodiment of the present invention described hereinbefore, inputs to the device are parameters pertinent to plant equipment and only those parameters that are highly associated physically and engineeringly and, moreover, processing attributes based on physical and engineering relations should be set beforehand. Examples of physically and engineeringly suitable arithmetic processing include exponentiation, integration, differentiation, averaging, deviation, four arithmetic operations, Fourier transform, Laplace transform, exponential function, square root, logarithmic function, factorial, difference in sequence, etc. Modeling of the plant equipment is performed by carrying out suitable arithmetic processing such as learning. Furthermore, in the first embodiment of the present invention, for target plant equipment to be modeled, it would be expedient to implement model creation operations divided into points of view in modeling per target equipment.

FIG. 4 exemplifies parameters D11 that are highly associated physically and engineeringly about electric characteristics pertinent to a rotating electric machine such as a generator and a rotating electric machine auxiliary among operating data D1 (parameters) in a general thermal power plant depicted in FIG. 2. Examples of the parameters D11 include active power, reactive power, power factor, armature current, armature voltage, field current, field voltage, rotational speed, etc.

FIG. 5A, FIG. 5B, FIG. 5C, and FIG. 5D exemplify parameters D12 that are highly associated physically and engineeringly about vibratory characteristics pertinent to the rotating electric machine such as the generator and the rotating electric machine auxiliary among operating data D1 (parameters) in the general thermal power plant depicted in FIG. 2. Examples of the parameters D12 include active power, reactive power, power factor, armature current, armature voltage, field current, field voltage, rotational speed, shaft vibration, bearing vibration, etc.

FIG. 6A, FIG. 6B, FIG. 6C, and FIG. 6D exemplify parameters D13 that are highly associated physically and engineeringly about thermal characteristics pertinent to the rotating electric machine such as the generator and the rotating electric machine auxiliary among operating data D1 (parameters) in the general thermal power plant depicted in FIG. 2. Examples of the parameters D13 include active power, reactive power, power factor, armature current, armature voltage, field current, field voltage, rotational speed, stator coil temperature, rotor coil temperature, cooling medium temperature inside the machine, etc.

Now, in the first embodiment, an example has been described in which a generator in the terminal power plant is selected as target equipment for which model creation and data sorting are performed; however, needless to say, the target equipment is not limited to the generator or the thermal power plant.

The target equipment is learned with respect to each point of view in model creation and data sorting and a model specific to the point of view is created and, accordingly, data is sorted. Furthermore, by combining models specific to plural points of view, an overall model of the target equipment model can be created and, accordingly, data can be sorted.

Second Embodiment

Description to explain a second embodiment concerns carrying out monitoring and diagnosis of target equipment using a normal-value data database DB2 created in the first embodiment. In particular, the description concerns evaluating operating data D1 from the target equipment.

FIG. 7 is a diagram depicting an example of a structure of a monitoring and diagnosis device for plant equipment according to the second embodiment. The monitoring and diagnosis device 3 of the second embodiment takes the following inputs: operating data D1 from the operating data database DB1 in which data of measurements of target equipment to be monitored, e.g., a generator G and its peripheral equipment G1, G2 is stored; normal value data D2 registered in a normal-value data database DB2 depicted in FIG. 1; weights a; a threshold list in which thresholds for distinguishing that an error falls within a normal range are recorded; and data S to be handled. In this case, the normal-value data database DB2 may be either a normal-value data database DB2 that represents an overall characteristics model or a set of discrete normal-value data databases DB22, DB22, DB23 regarding electric, vibratory, and thermal characteristics. The data S to be handled is the same as described in the first embodiment and its description is omitted here. In an example that is provided later, the normal-value data database DB2 that represents an overall characteristics model is illustrated, unless there are special circumstances.

Now, the normal-value data database is not necessarily limited to a normal-value data database DB2 created in the first embodiment and a database created by another device and method may be used for it.

In addition, although the operating data database DB1 and the normal-value data database DB2 are depicted as discrete databases in FIG. 7, the operating data database DB1 and the normal-value data database DB2 may be integrated in a common structure. One database may be made to function as the operating data database DB1 and the normal-value data database DB2, for example, by flagging operating data indicating normal values among operating data in the operating data database DB2, and by specifying a period for which data indicates normal values among operating data stored in a time-series manner.

Now, in the structure depicted in FIG. 7, information registered in the normal-value data database DB2 is assumed to be created based on operating data acquired from the target equipment, for example, in an initial state just after being installed, and information registered in the operating data database DB1 is assumed to represent the latest operating data from the same target equipment having experienced operation. Therefore, here, an evaluation will be made of the latest state of the same target equipment based on its quasi-normal state.

In addition, information registered in the normal-value data database DB2 may not necessarily be records of normal value data of the same target equipment, but may be records of normal value data of an equipment that is, for example, the same type as the target equipment or similar to the target equipment if there is a sufficient correlation between the characteristics of the target equipment and of the latter equipment. Also, information registered in the operating data database DB1 does not necessarily need to be the latest operating data; for instance, an evaluation may be made of past operating data using normal value data extracted from the latest operating data.

A determination/evaluation unit 31 in a monitoring and diagnosis unit 30 configured with a computer determines and/or evaluates an abnormality sign and/or an abnormality level of a rotating electric machine and/or a rotating electric machine auxiliary, according to how far a difference between a measured value and a predicted value obtained by reflecting normal value data D2 (in the normal-value data database DB2) created by the data sorting device 2 in a measured value of data for evaluation (data for which it is wanted to check for presence of an abnormality sign and/or abnormality) and/or a difference in correlations between a normal model and a measured data for each parameter exceeds any given threshold.

Alternatively, the determination/evaluation unit 31 in the monitoring and diagnosis unit 30 determines and/or evaluates an abnormality sign and/or an abnormality level of a rotating electric machine and/or a rotating electric machine auxiliary, according to how far a difference between pieces of data exceeds any given threshold, such as learned data (normal data) and data for evaluation and/or measured data of plural parameters for which similar objects are measured in identical units in one rotating electric machine and/or one rotating electric machine auxiliary and/or measured data of plural parameters for which similar objects are measured in identical unit in a plurality of similar distinct rotating electric machines and/or rotating electric machine auxiliaries.

Determination/evaluation can be made using one or a combination of various methods mentioned in conjunction with the third handling step for driving normal value data D2 described in the first embodiment.

Processing described above that is performed by the determination/evaluation unit 31 in the monitoring and diagnosis unit 30 can be stated quite simply as follows: under the same operating condition and when the same parameter is input, an evaluation is made of how similar or differing a normal value data and a value obtained by actual measurement are and a determination is made of abnormality or an abnormality level. To determine how similar or differing these values are, an appropriate threshold is given from the list of thresholds. A concept of these thresholds may be configured including, inter alia, a threshold indicating a degree of deviation from a normal range when a statistical method such as an MT method is adopted.

Now, when the determination/evaluation unit 31 in the monitoring and diagnosis unit 30 performs the processing described above, the data S to be handled that is input is used to identify corresponding pieces of data which are to be compared actually from two databases DB1 and DB2.

The above-described processing that is performed by the determination/evaluation unit 31 in the monitoring and diagnosis unit 30 is described below more specifically. First, in the normal-value data database DB2, time-series information representing input variables x and an output variable y is recorded and, moreover, information representing weights m between the variables and processing attributes is included. Also, in the operating data database DB1, time-series information representing input variables x and an output variable y is recorded as operating data.

A first step of the processing that is performed by the determination/evaluation unit 31 in the monitoring and diagnosis unit 30 calculates yn=a1x1m1+a2x2m2+a3x3m3 on data retrieved from the normal-value data database DB2. Input variables x1, x2, x3 are normal value data, m1, m2, m3 are processing attributes given initially, and a1, a2, a3 are weights determined by learning in the learning unit. An output variable yn determined by this calculation is handled as a reference value.

A next step of the processing that is performed by the determination/evaluation unit 31 in the monitoring and diagnosis unit 30 calculates yd=a1x1'm1+a2x2'm2+a3x3'm3 on data retrieved from the operating data database DB1.

Input variables x1', x2', x3' are pieces of operating from the operating data database, DB1, m1, m2, m3 are processing attributes given initially, and a1, a2, a3 are weights determined by learning in the learning unit. An output variable yd determined by this calculation is handled as a value to compare.

A final step of the processing that is performed by the determination/evaluation unit 31 in the monitoring and diagnosis unit 30 evaluates the output variable yd which is the value to compare by the output variable yn which is the reference value. For example, an evaluation is made of a difference between both the variables, referring to the threshold list in which a threshold for distinguishing that an error falls within a normal range is recorded.

Now, the foregoing processing that is performed by the determination/evaluation unit 31 in the monitoring and diagnosis unit 30 may makes an online evaluation of operating data D1 measured successively or may make an online evaluation of operating data once stored in the operating data database DB1. Also, while data comparison may be performed on data acquired point by point of time, comparison may be performed on a time series set of data according to a statistical method.

Figures 8, 9:
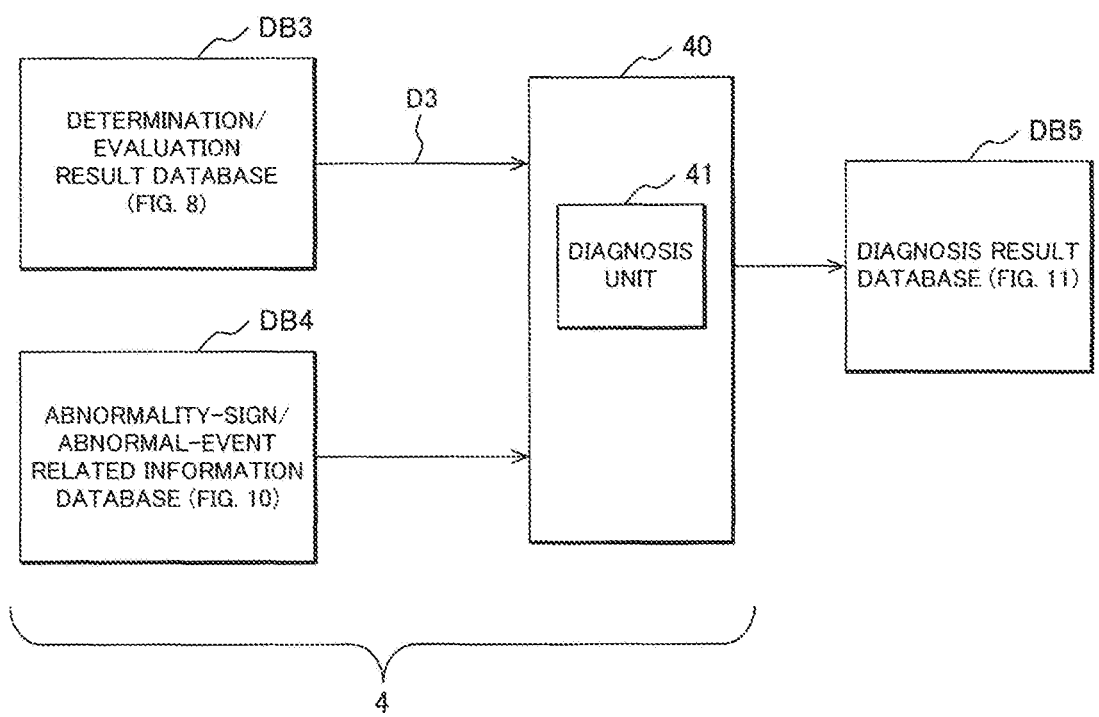
FIG. 8 is a diagram representing an example of recorded contents of a determination/evaluation result database DB3.
FIG. 9 is a diagram depicting an example of a structure of a monitoring and diagnosis device for plant equipment according to a third embodiment.

A result of determination made by the determination/evaluation unit 31 is recorded in a determination/evaluation result database DB3 as determination/evaluation result data D3. FIG. 8 is a diagram representing an example of recorded contents of the determination/evaluation result database DB3.

In the example of records in FIG. 8, with regard to operating data (parameters) D32, time of measurement D31 (or time of occurrence of a difference), an evaluation method D33 by which a difference is evaluated (a statistical method, here), a threshold D33 used at the time, and a difference from the threshold D35 are recorded in a list display form. However, if the evaluation of a difference does not function properly, data indicating it ("Not applicable" in the presented example) is recorded.

According to the monitoring and diagnosis device for plant equipment in the second embodiment, by evaluating operating data using normal value data created by the data sorting device 2, it would become possible to perform a determination and/or evaluation of an abnormality sign or abnormality easily and/or in a high reliable manner.

Advantageous effects of the second embodiment 2 are as follows. First, it is possible to contribute to improvement in reliability or preventive maintenance of target equipment to be monitored.

It is possible to determine and/or evaluate an abnormality sign and/or an abnormality level of a rotating electric machine which is target equipment to be monitored; this makes it possible that the rotating electric machine is allowed to operate without the need of personnel for data analysis of the power plant or even with a minimal number of persons responsible for data analysis.

It is possible to determine and/or evaluate an abnormality sign and/or an abnormality level of a rotating electric machine; this makes it possible that, if an abnormality sign and/or abnormality is not present or is present, but it is on a low level, the time interval between periodic inspections of the rotating electric machine would be extended.

It is possible to determine and/or evaluate an abnormality sign and/or an abnormality level of a rotating electric machine; this makes it possible that, if an abnormality sign and/or abnormality is presented and/or present on a high level, a prediction would be made of progress of an occurred event of which an abnormality sign and/or abnormality is present and/or presented on a high level and, accordingly, the power plant may be stopped systematically and inspection performed. Accidental unplanned power outage can be prevented.

It is possible to determine and/or evaluate an abnormality sign and/or an abnormality level of a rotating electric machine; this makes it possible that, if an abnormality sign and/or abnormality is presented and/or present on a high level, preparation and/or replacement would be made with regard to suitable timing and/or a suitable number of personnel and/or quantity and/or suitable parts and/or an equipment.

It is possible to determine and/or evaluate an abnormality sign and/or an abnormality level of a rotating electric machine; this makes it possible that, if an abnormality sign and/or abnormality is presented and/or present on a high level, a worst-case scenario such as accidental power outage, rotating armature and/or an earth fault, or a serious short circuit accident would be obviated.

Now, according to FIG. 7 for the second embodiment, the determination/evaluation unit 31 creates a reference value yn using weights m and normal value data D2 created by the learning unit St1 in FIG. 1; nevertheless, the learning unit which outputs normal value data D2 may be configured, incorporated in the determination/evaluation unit 31 so that learning is performed with normal value data D2 obtained in the learning unit to calculate a result of modeling and weights m and create a reference value yn.

Third Embodiment

Description to explain a third embodiment concerns carrying out monitoring and diagnosis of target equipment using determination/evaluation results created in the second embodiment. In particular, the description relates to identifying a result of diagnosis of an abnormal event in the target equipment.

FIG. 9 is a diagram depicting an example of a structure of a monitoring and diagnosis device for plant equipment according to the third embodiment. In the monitoring and diagnosis device 4 of the third embodiment, determination/evaluation result data D3 from the determination/evaluation result database DB3, obtained in the second embodiment with regard to operating data of target equipment to be monitored, e.g., a generator G and its peripheral equipment G1, G2, is captured into a monitoring and diagnosis unit 40. Also, in the monitoring and diagnosis device 4 of the third embodiment, from an abnormality-sign/abnormal-event related information database DB4 which is illustrated in FIG. 10, abnormality-sign/abnormal-event related information D4 is captured into the monitoring and diagnosis unit 40.

Abnormality-sign/abnormal-event related information D4 prepared beforehand in the abnormality-sign/abnormal-event related information database DB4 includes order of occurrence D41 if plural events involved in an abnormality sign and an abnormal event occur in a chain reaction, an occurred event D42, a parameter D43, a threshold D44, recommendations D45 which are maintenance measures against the abnormality, etc. According to this, order in which abnormality progresses (in the order of a-1, a-2, a-3, a-4, a-5, and a-6), what abnormal event will occur subsequently, and countermeasures that should be taken currently, among others, are described comprehensively.

A diagnosis unit in the monitoring and diagnosis unit 40 first refers to the determination/evaluation result database DB3, reads a difference from a threshold in operating data (parameter) D32 sequentially, and, then, refers to the abnormality-sign/abnormal-event related information database DB4. At this time, the diagnosis unit identifies an occurred event as an event that causes the difference from the threshold by a parameter D43 associated with the operating data (parameter) D32 and, moreover, acquires information about an extent of progress of the abnormality, recommendations, etc. and registers these into a diagnosis result database DB5 as diagnosis result data D5.

FIG. 11 represents an example of diagnosis result data D5 thus obtained. Information registered as the diagnosis result data D5, which partially duplicates abnormality-sign/abnormal-event related information D4, is a set of data put in order sequentially as firm information on abnormality in the plant equipment in which the abnormality is identified particularly. The diagnosis result data D5 includes detected event cases D51, order of occurrence D52 if plural events involved in an abnormality sign and an abnormal event occur in a chain reaction, an occurred event D53, a parameter D54, a threshold D55, result D56 relevant to the abnormality, etc.

As described above, in the third embodiment, the abnormality-sign/abnormal-event related information database DB4 is provided in which abnormal events, each of which is associated with a parameter for which an abnormal value is detected and an abnormality level, are organized by abnormality sign and/or abnormality level. It is possible to identify a probable cause and/or a probable progress flow of occurred events and/or recommendations, based on the determination/evaluation result data D3.

According to the third embodiment, a probable cause and/or a probable progress flow of occurred events and/or recommendations are presented by abnormality sign and/or abnormality level of plant equipment; this makes it possible that the plant is allowed to operate without the need of personnel for data analysis of the power plant or with a minimal number of persons responsible for data analysis.

Fourth Embodiment

Description to explain a fourth embodiment concerns carrying out monitoring and diagnosis of target equipment using diagnosis results obtained in the third embodiment. In particular, the description relates to forecasting abnormality in the target equipment and creating a detection report on an abnormal event.

Figure 12:
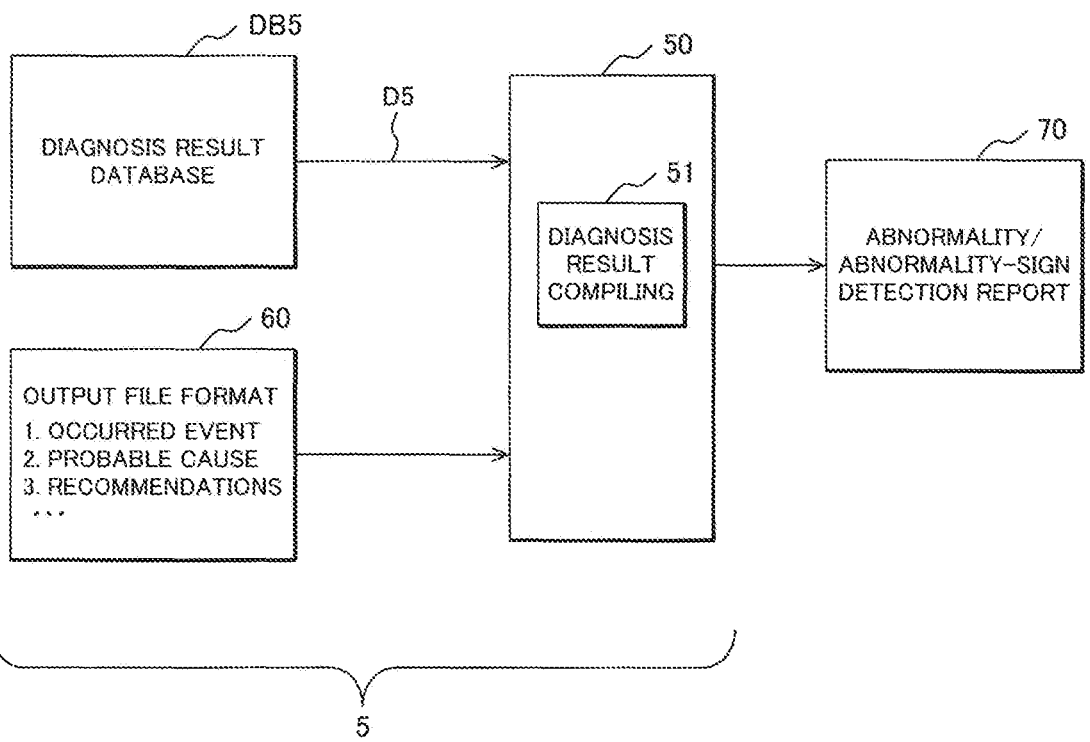
FIG. 12 is a diagram depicting an example of a structure of a monitoring and diagnosis device for plant equipment according to a fourth embodiment.

FIG. 12 is a diagram depicting an example of a structure of a monitoring and diagnosis device for plant equipment according to a fourth embodiment. In the monitoring and diagnosis device 5 of the fourth embodiment, diagnosis result data D5 from the diagnosis result database DB5, obtained in the third embodiment with regard to operating data of target equipment to be monitored, e.g., a generator G and its peripheral equipment G1, G2, is captured into a monitoring and diagnosis unit 50. Also, in the monitoring and diagnosis device 5 of the fourth embodiment, information of an output file format 60 in which instructions are specified by the model designer M using an input device (not depicted) such as a keyboard of the terminal Tm is captured into the monitoring and diagnosis unit 50.

Now, the instructions for display in the output file format 60 are requests for external output of an occurred event, a probable cause that is predicted, and recommendations which are countermeasures in that case.

Figure 13:
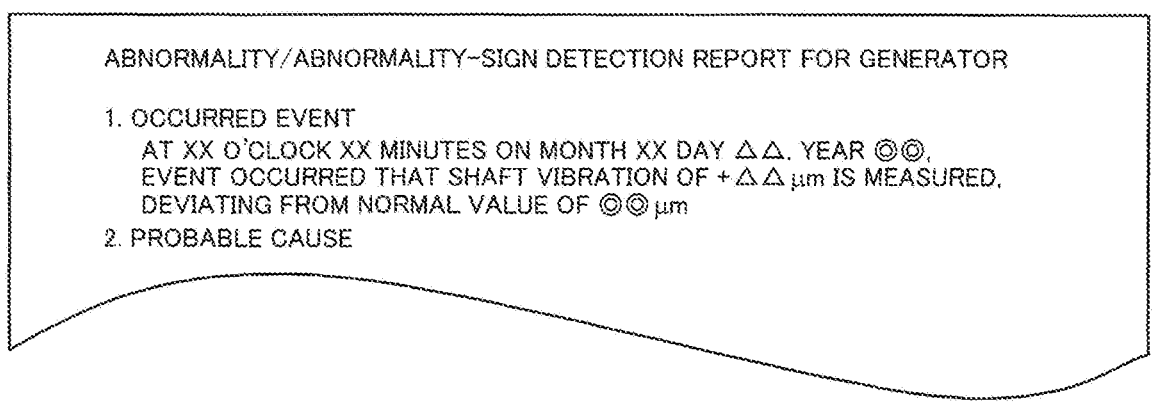
FIG. 13 is a diagram representing an example of creating an abnormality/abnormality-sign detection report on paper.

A diagnosis result compiling unit in the monitoring and diagnosis unit 50 extracts necessary information from diagnosis result data D5 registered in the diagnosis result database DB5 according to the instructions for display in the output file format 60, creates an abnormality/abnormality-sign detection report 70, and outputs it externally. An external output is performed, such as displaying it on a monitor screen and printing it on paper. FIG. 13 is an example of creating the abnormality/abnormality-sign detection report 70, for example, on paper.

In the fourth embodiment, as described above, status data of plant equipment is automatically compiled and/or output regardless of whether an abnormal sign and/or abnormality occurs. Furthermore, a probable cause and/or a probable progress flow of occurred events and/or recommendations regarding the relevant abnormal event are automatically copied and output in an appropriate place in the specified format. It is possible to automatically compile and output status data of a rotating electric machine including an abnormality sign and/or abnormal event of plant equipment; this makes it possible to dispense with personnel for data analysis of the power plant and/or personnel who creates a report or minimize the number of persons responsible for data analysis or creating a report.

Fifth Embodiment

In a fifth embodiment, it is expedient to additionally capture and input data corresponding to parameters regarding plant equipment other than a rotating electric machine and a rotating electric machine auxiliary.

By additionally capturing and inputting data corresponding to parameters regarding plant equipment other than a rotating electric machine and a rotating electric machine auxiliary, it is possible to detect an event of abnormality and/or an abnormality sign of the rotating electric machine and/or the rotating electric machine auxiliary occurring due to plant equipment other than the rotating electric machine and the rotating electric machine auxiliary. In addition, reliability of a probable cause is improved because the data corresponding to parameters regarding plant equipment other than the rotating electric machine and the rotating electric machine auxiliary is captured and input additionally.

The present invention can be applied widely to plants and equipment other than a thermal power plant as well.

LIST OF REFERENCE CHARACTERS

1: thermal power plant
2: data sorting device
3, 4, 5: monitoring and diagnosis device
30, 40, 50: monitoring and diagnosis unit
31: determination/evaluation unit
41: diagnosis unit
51: diagnosis result compiling
a1, a2, a3: weight
B: boiler
B1: boiler auxiliary
C: condenser
D1, D11, D12, D13: operating data
DB1: operating data database
D2, D21, D22, D23: normal value data
D3: determination/evaluation result data
D5: diagnosis result data
DB2, DB21, DB22, DB23: normal-value data database
DB3: determination/evaluation result database
DB4: abnormality-sign/abnormal-event related information database
DB5: diagnosis result database
G: generator
G1: generator auxiliary
G2: generator excitation circuit
m1, m2, m3: processing attribute
S: data to be handled
ST: learning unit
ST1: electric characteristics learning unit
St2: vibratory characteristics learning unit
St3: thermal characteristics learning unit
T: turbine
T1: turbine auxiliary
x1, x2, x3: input variable
y: output variable

What is claimed is:

1. A computer-implemented method training a learning network to diagnose anomalies in plant equipment, the computer-implemented method comprising:
receiving operating data from sensors that monitor the plant equipment;
storing the operating data and a time when the operating data was collected by the sensors in a first database;
excluding abnormal values from the operating data to form filtered data;
training an electric characteristics learning unit using a first subset of the filtered data to generate first weighting factors;
training a vibratory characteristics learning unit using a second subset of the filtered data to generate second weighting factors;
training a thermal characteristics learning unit using a third subset of the filtered data to generate third weighting factors;
storing the first weighting factors, the second weighting factors and the third weighting factors in a second database;
creating a model for nominal operation using the first weighting factors, the second weighting factors and the third weighting factors that are stored in the second database;
receiving additional data from the sensors that monitor the plant equipment; and
diagnosing the anomalies in the plant equipment by inputting the additional data into the model for nominal operated created.

2. The computer-implemented method according to claim 1, the method further comprising:
recommending countermeasures based on the anomalies in the plant equipment diagnosed, wherein the countermeasures are stored in a determination/evaluation result database.

3. The computer-implemented method according to claim 1, wherein the plant equipment is a rotating electric machine.

4. A non-transitory computer readable storage medium that stores instructions for
training a learning network to diagnose anomalies in plant equipment, the instructions when executed by a processor cause the processor to execute a method, the method comprising:
receiving operating data from sensors that monitor the plant equipment
storing the operating data and a time when the operating data was collected by the sensors in a first database;
forming filtered data by excluding abnormal values from the operating data;
training an electric characteristics learning unit using a first subset of the filtered data to generate first weighting factors;

training a vibratory characteristics learning unit using a second subset of the filtered data to generate second weighting factors;

training a thermal characteristics learning unit using a third subset of the filtered data to generate third weighting factors;

storing the first weighting factors, the second weighting factors and the third weighting factors in a second database;

creating a model for nominal operation using the first weighting factors, the second weighting factors and the third weighting factors that are stored in the second database;

receiving additional data from the sensors that monitor the plant equipment; and diagnosing the anomalies in the plant equipment by inputting the additional data into the model for nominal operated created.

5. The non-transitory computer readable storage medium according to claim 4, wherein the method further comprises:

recommending countermeasures based on the anomalies in the plant equipment diagnosed, wherein the countermeasures are stored in a determination/evaluation result database.

6. The non-transitory computer readable storage medium according to claim 4, wherein the plant equipment is a rotating electric machine.

7. A system for
training a learning network to diagnose anomalies in plant equipment, comprising:

sensors that monitor the plant equipment;

an operating data database that stores operating data collected by the sensors and a time when the operating data was collected by the sensors a normal-value data database; and a computer that is communicatively coupled to the sensors, the operating data database and the normal-value data database, wherein the computer is configured to:

retrieve the operating data from the operating data database, form filtered data by excluding abnormal values from the operating data, trains an electric characteristics learning unit using a first subset of the filtered data to generate first weighting factors, trains a vibratory characteristics learning unit using a second subset of the filtered data to generate second weighting factors, trains a thermal characteristics learning unit using a third subset of the filtered data to generate third weighting factors, stores the first weighting factors, the second weighting factors and the third weighting factors in the normal-value data database, creates a model for nominal operation using the first weighting factors, the second weighting factors and the third weighting factors that are stored in the normal-value data database;

receives additional data from the sensors that monitor the plant equipment; and diagnose the anomalies in the plant equipment by inputting the additional data into the model for nominal operated created.

8. The system according to claim 7 further comprising:

a determination/evaluation result database that is communicatively coupled to the computer, wherein the computer is further configured to:

recommend countermeasures based on the anomalies in the plant equipment diagnosed, wherein the countermeasures are stored in the determination/evaluation result database.

9. The system according to claim 7, wherein the plant equipment is a rotating electric machine.

* * * * *